(12) United States Patent
Nelson et al.

(10) Patent No.: US 6,911,969 B1
(45) Date of Patent: Jun. 28, 2005

(54) HANDHELD COMPUTER APPARATUS

(75) Inventors: Scott A. Nelson, Eagan, MN (US); James C. Lee, Plymouth, MN (US); Michael A. Helgeson, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 843 days.

(21) Appl. No.: 09/071,488

(22) Filed: May 1, 1998

(51) Int. Cl.$^7$ .................................................. G09G 5/08

(52) U.S. Cl. .......................................... 345/163; 345/7

(58) Field of Search ................................. 345/7–9, 163, 345/169, 156–158, 347, 352, 357

(56) References Cited

U.S. PATENT DOCUMENTS

| | | |
|---|---|---|
| 3,971,013 A | 7/1976 | Challoner et al. |
| 4,025,903 A | 5/1977 | Kaufman et al. |
| 4,060,848 A | 11/1977 | Hyatt |
| 4,224,615 A | 9/1980 | Penz |
| 4,257,306 A | 3/1981 | Laflamme |
| 4,274,093 A | 6/1981 | Judge |
| 4,310,849 A | 1/1982 | Glass |
| 4,545,023 A | 10/1985 | Mizzi |
| 4,559,555 A | 12/1985 | Schoolman |
| 4,636,866 A | 1/1987 | Hattori |
| 4,639,225 A | 1/1987 | Washizuka |
| 4,706,117 A | 11/1987 | Schoolman |
| 4,737,972 A | 4/1988 | Schoolman |
| 4,758,717 A | 7/1988 | Shepard et al. |

(Continued)

FOREIGN PATENT DOCUMENTS

| | | |
|---|---|---|
| EP | 0540393 A | 5/1993 |
| EP | 0637794 A | 2/1995 |
| WO | 9521408 A | 8/1995 |

OTHER PUBLICATIONS

Siewiorok D P; "Wearable Computers: Merging Information Space with the Workspace" Proceedings of the Intl. Conf. On Computer Design: VLSI in Computers and Processors, Cambridge, MA. Oct. 3–6, 1993.

Asim Smailagic et al; Modalities of Interaction with CMU Wearable Computers IEEE Personal Communications, vol. 3, No. 1, Feb. 1, 1996.

Rekimoto J et al: The World Through the Computer: Computer Augmented Interaction With Real World Environments: UIST '95. 8$^{th}$ Annual Symposium on User Interface Software and Technology. Proceedings of the ACM Symposium on User Interface and Technology, Pittsburgh,PA., Nov.14–17,1995.

(Continued)

*Primary Examiner*—Jimmy H. Nguyen
(74) *Attorney, Agent, or Firm*—Mueting Raasch & Gebhardt, P.A.

(57) ABSTRACT

A computer apparatus includes a computer processing unit including a processor device for operating upon data and providing data for display. The apparatus further includes a handheld input/output display unit. The display unit includes a housing sized to be grasped by a user's hand. A computer display is located within the housing at a position to allow the user to view the computer display through an eyepiece. A display driver is used for presenting data from the processing unit on the computer display. Navigational input tools are integrated with the computer display in the housing and operatively connected to provide user input to the processing unit. The navigational input tools are positioned for operation by one or more fingers of the user's grasping hand. The computer processing unit may be integrated within the housing of the handheld input/output display unit. The navigational input tools may include a mouse having a force actuated pointer and at least one button, e.g., a single button mouse or a two button mouse, or may include a three button interface.

19 Claims, 23 Drawing Sheets

U.S. PATENT DOCUMENTS

| | | | |
|---|---|---|---|
| 4,905,001 A | | 2/1990 | Penner |
| 4,916,441 A | | 4/1990 | Gombrich |
| 4,931,950 A | | 6/1990 | Isle et al. |
| 4,994,987 A | | 2/1991 | Baldwin |
| 5,003,300 A | | 3/1991 | Wells |
| 5,015,831 A | | 5/1991 | Eastman et al. |
| 5,052,504 A | | 10/1991 | Ikeda et al. |
| 5,144,119 A | | 9/1992 | Chadima, Jr. et al. |
| 5,148,155 A | | 9/1992 | Martin et al. |
| 5,175,534 A | | 12/1992 | Thatcher |
| 5,208,449 A | | 5/1993 | Eastman et al. |
| 5,267,181 A | | 11/1993 | George |
| 5,281,957 A | | 1/1994 | Schoolman |
| 5,285,398 A | | 2/1994 | Janik |
| 5,305,244 A | | 4/1994 | Newman et al. |
| 5,432,510 A | * | 7/1995 | Matthews .................. 341/20 |
| 5,450,596 A | | 9/1995 | Felsenstein |
| 5,491,651 A | | 2/1996 | Janik |
| 5,579,165 A | | 11/1996 | Michel et al. |
| 5,964,830 A | * | 10/1999 | Durrett ..................... 709/200 |

OTHER PUBLICATIONS

Product Literature, "The ProView™ 30 Head Mounted Display System", Kaiser Electro–Optics Laser, Inc., 4 pgs., (available at least in Apr. 1997).

C. Murray, "Head–Mounted Display Simplifies Surgery", *Design News*, pp. 102–103, Aug. 11, 1997.

D. Baum, "VIMAD," *Scientific Honeyweller*, 5(2), pp. 45–51, Jun. 1984.

J. Robertson, "Remote users eye tiny FPDs," *Electronic Buyers News*, May 1997.

Product Literature, "Advanced Flat Panel Head Mounted Display Program", *R&D Programs, Electronics Technology Office*, http://esto.sysplan.com, 2 pgs., (accessed via internet Apr. 1997) (last updated Apr. 1996).

Product Literature, "HIDEF Family", *KEO*, http://www.keo.com, 2 pgs., (accessed via internet Apr. 1997).

Product Literature, "Kaiser Electro–Optics", *KEO*, http://www.keo.com, 4 pgs., (accessed via internet Apr. 1997) (copyright 1997).

Product Literature, "Full Immersion Head Mounted Display (FIHMD)", *ISO Planning & C3 Program Portfolio*, http://maco.dc.isx.com, 2 pgs., (accessed via internet Apr. 1997).

Product Literature, "Head Mounted Display", http://ece.clemson.edu, 1 pg., (accessed via internet Apr. 1997).

Product Literature, "Head Mounted Displays (HMD)", *R&D Programs, Electronics Technology Office*, http://esto.sysplan.com, 3 pgs., (accessed via internet Apr. 1997).

Product Literature, *Intervision*, http://www.intervisionsystems.com, 6 pgs., (accessed via internet May 1997) (copyright 1995, 1996).

Product Literature, "Look Past Today With Trekker™", *Personal Information Systems*, http://www.cacd.rockwell.com, 4 pgs., (accessed via internet May 1997) (copyright 1996).

Product Literature, "Boeing Wearable Computer Workshop Breakout Session Summaey", *Boeing Wearable Computer Workshop*, http://www.cs.smu.edu, 3 pgs., (accessed via internet May 1997).

Product Literature, "The MIT Wearable Computing Page", http://lcs.www.media.mit.edu, 5 pgs., (accessed via internet May 1997).

Product Literature, "Wearable Computing Research Group", *University of Oregon Computer & Information Science*, http://www.cs.uoregon.edu, 2 pgs., (accessed via internet May 1997) (last updated Jan. 1997).

Product Literature, "Electronic Performance Support System", *EPSS*, http://mime1.marc.gatech.edu, 6 pgs., (accessed via internet May 1997) (last updated Apr. 1997).

Product Literature, "Shape Deposition Manufacturing", http://www–rpl.stanford.edu, 2 pgs., (accessed via internet May 1997).

Product Literature, "The DeVry Student Chapter I.E.E.E. Official Wearable Computer Homepage", http://www.devrycols.edu, 3 pgs., (accessed via internet May 1997) (copyright 1997).

Product Literature, "Jeff Hartman's Wearable Computer Technical page:", http://www.netwalk.com, 2 pgs., (accessed via internet Apr. 1997) (Last updated Jan. 1997) (copyright 1996).

Product Literature, "The Ultimate Portable Computer?", *News &Views*, Copyright 1994–1997, http://www.byte.com, 2 pgs., (accessed via internet Apr. 1997) (copyright 1994–1997).

Product Literature, "Oregon Wearable Computer Wiring Diagram," http://www.cs.uoregon.edu/research/wearables/Oregon/netman3.gi, 3 pgs., (accessed via internet May 1997).

Product Literature, "Details about the WetPC™," *WetPC (tm)diagrams*, http://www.aims.gov.au/pages/wetpc/wpcdiag.html, 1 pg., (accessed via internet May 1997) (last updated Jan. 1997).

Product Literature, "Commercialising the Technology," *WetPC (tm) commercialisation*, http://www.aims.gov.au/pages/wetpc/wpccom.html, 2 pgs., (accessed via internet May 1997) (last updated Jan. 1997).

Product Literature, "Technical backgrounder," *WetPC (tm) Backgrounder*, http://www.aims.gov.au/pages/wetpc/wpcbkgrnder.html#specs, 5 pgs., (accessed via internet May 1997) (last updated Jan. 1997).

Product Literature, Wearable, Tetherless, Computer–Mediated Reality (with possible future applications for the disabled), http://www.wearcam.org/tetherless/, 1 pg., (accessed via internet May 1997).

Product Literature, "General Information," *General Information—On–Site Wearable Computer Systems*, http://www.cs.cmu.edu/afs/cs.cmu.edu/project/vuman/www/general.html, 2 pgs., (accessed via internet May 1997) (last updated Jun. 1995).

Product Literature, *"About Cybernaut Corporation & The Mobile Assistant II™,"* http://wwww.xybernaut.com/about1.html, 5 pgs., (accessed via internet May 1997).

Product Literature, "WS 1000 Wearable System with RS 1 Ring Scanner," *WS 1000 Wearable System with RS 1 Ring Scanner*, http://www.symbol.com/ST000262.HTM, 8 pgs., (accessed via internet May 1997).

Product Literature, "RS 1 Ring Scanner," *RS 1 Ring Scanner*, http://www.symbol.com/ST000266.HTM, 5 pgs., (accessed via internet May 1997).

Product Literature, "Virtuo Vue Palm–Sized Portable Display," 1 pg.

Product Literature, "Office–on–an–arm hits the streets," *News Trends*, 1 pg.

Product Literature, "A Cyberscreen So Tiny It Fits On A Dime," *Business Week*, p. 126C, Apr. 21, 1997.

Product Literature, "Wearable Computer," *Appliance Manufacturer*, p. 8, Mar. 1996.

* cited by examiner

Today's Tasks

Name: J. Peterson
Job: #63
Shift: 7-3

| ▽ Description | Type | Done |
|---|---|---|
| Non-essential lighting is turned off | Weekly | X |
| Complete the Environmental compliance log sheet | Weekly | |
| Call in the following levels at VRU200 | Weekly | |

Call in the following levels at VRU200.
If levels do not agree, blowdown the sightglass. If level still doesn't agree, write a work order to set/repair level indications.

| Name | Pi Name | Description | Assigned | Value | OK? | Reading | Done |
|---|---|---|---|---|---|---|---|
| F-201 | L02133 | F201 ABS FEED DRUM | #63 | 63.6% | OK >> n/a | n/a | n/a |
| E-201 | L02161 | E201 ABSORBER BOTTOM | #63 | 57% | OK >> n/a | n/a | n/a |
| E-203 | L02361 | E203 DEPROP BOTTOM | #63 | 66.1% | OK >> n/a | 60% | JP |
| F-203 | L02383 | E203 DEPROP REFLUX DRUM | #63 | 19.7% | OK >> n/a | OK | DD |
| E-205 | L02526 | E205 DEPROP BOTTOM | #63 | 85.1% | OK >> n/a | 75% | JP |
| F-217 | L02558 | E205 DEPROP REFLUX DRUM | #63 | 52.9% | OK >> n/a | OK | JP |
| V-2 | L02561 | V-2 BOTTOM | #63 | 35.8% | OK >> n/a | | |
| V-2A | L02661 | V-2A BOTTOM | #63 | 79.1% | OK >> n/a | | |

| Logout | View Todays Tasks | View Process Data | Schedule Task | Review All Tasks |
|---|---|---|---|---|
| Help | Back | Forward> | Reload | Administer System |

*Fig. 8B*

HANDHELD COMPUTER APPARATUS

FIELD OF THE INVENTION

The present invention is generally related to computing devices. More particularly, the present invention pertains to hand-held computer devices and user interfaces for such devices.

BACKGROUND OF THE INVENTION

Display technologies are emerging which have importance for a variety of applications. For example, new display technologies are being used in hand-held personal digital assistants (PDAs), head-mounted displays (HMDs), miniature monoculars or binoculars, etc. Recent advances in hardware and software technologies enable the application of powerful computing platforms in a comfortable, body-worn format. Application of wearable computers allows for individual users to remain integrated with information systems while operating hands-free and/or without hard-wire connection of such computers to other components. For example, wearable computers provide only a limited advantage if the computing platform must continue to be connected to a fixed structure for power and/or network connectivity. Consequently, wearable systems rely upon wireless network technologies to enable these systems to be integrated into collaborative environments.

There is an increasing need for field-portable personal information processing systems (PIPSs) which allow collaborative communication between a user and other parties or information systems that can provide the user with needed information and/or direction. For example, collaborative communication, diagnosis, and action among control room and field personnel in the context of large-scale processing plants is highly desirable. For example, such functions are required between control room and field personnel in the context of large refineries, petrochemical plants, and pulp and paper mills. Field-portable personal information processing systems allow highly mobile, wireless access to a plant information infrastructure such as distributed control system (DCS) point data and on-line procedures. Personal information processing systems are used by field operations and maintenance personnel to enhance situation awareness, increase collaboration among and between field and control room personnel, and reduce operator-induced control and communication errors in the day-to-day operations of a processing plant.

Conventionally, computer devices have been used to provide personal information processing system functionality. Such computer devices generally have included various display devices and user interfaces. For example, such devices may include notebook pad-type devices, tablet input devices, head-mounted displays for hands-free operation, small or wearable keyboards, or voice actuation devices.

However, conventional devices used for personal information processing systems do not recognize problems associated with the human interface requirements for such systems. Personal display systems impose various problems associated with the input devices being used, ease of movement of the user, and compatibility with changing and/or harsh ambient environments where users require such devices. For example, the wearing of a display on a helmet may provide obstruction of a user's vision. Helmet-mounted displays add weight to the already heavy helmets causing stress on the user's body. Further, such head-mounted displays get easily bumped around as the wearer walks under obstructions in a processing plant environment or any other user environment. Further, wearable and tablet computers typically have displays plagued by a limited screen size and/or have various user input challenges. For example, users of such personal information systems may wear gear such as gloves or be required to carry a large quantity of accessories or gear. Inputting information into a personal information system when wearing gloves becomes a difficult process with most conventional systems. Even just navigating through information available in such systems when in the field with or without gloves may be challenging.

SUMMARY OF THE INVENTION

Generally, the present invention integrates a display and navigational input tools for use with a computing unit to address one or more of the problems relating to conventional devices described above.

A computer apparatus according to the present invention includes a computer processing unit including a processor device for operating upon data and providing data for display. The apparatus further includes a handheld input/output display unit. The display unit includes a housing sized to be grasped by a user's hand. A computer display is located within the housing at a position to allow the user to view the computer display through an eyepiece. A display driver is used for presenting data from the processing unit on the computer display. Navigational input tools are integrated with the computer display in the housing and operatively connected to provide user input to the processing unit. The navigational input tools are positioned for operation by one or more fingers of the user's grasping hand.

In one embodiment of the apparatus, the computer processing unit is positioned within the housing of the handheld input/output display unit.

In another embodiment of the apparatus, the navigational input tools include a mouse having a force actuated pointer and at least one button, e.g., a single button mouse or a two button mouse. In a further embodiment, the navigational input tools may include a three button interface.

In yet another embodiment of the apparatus, the housing includes a recessed thumb indent which includes a switch. The switch may be used to control power to the apparatus and/or control activation of the mouse.

A handheld apparatus for use with a computing unit according to the present invention includes a housing sized to be grasped by a user's hand having a longitudinal axis extending therethrough from a first end to a second end. The housing includes an upper surface and a lower surface extending from the first end to the second end. Further, the housing includes an eyepiece at the first end of the housing. A computer display is located within the housing at a position to allow the user to view the computer display through the eyepiece. Navigational input tools are integrated within the housing with the computer display such that the navigational input tools are operable at the upper surface of the housing by one or more fingers of the user's grasping hand.

BRIEF DESCRIPTION OF THE DRAWINGS

FIGS. 8A–8B are display screens used to describe the graphical user interface for use with the navigational input tools integrated in the hand-held input/output display unit of FIG. 4.

DETAILED DESCRIPTION OF THE EMBODIMENTS

Figure 1:
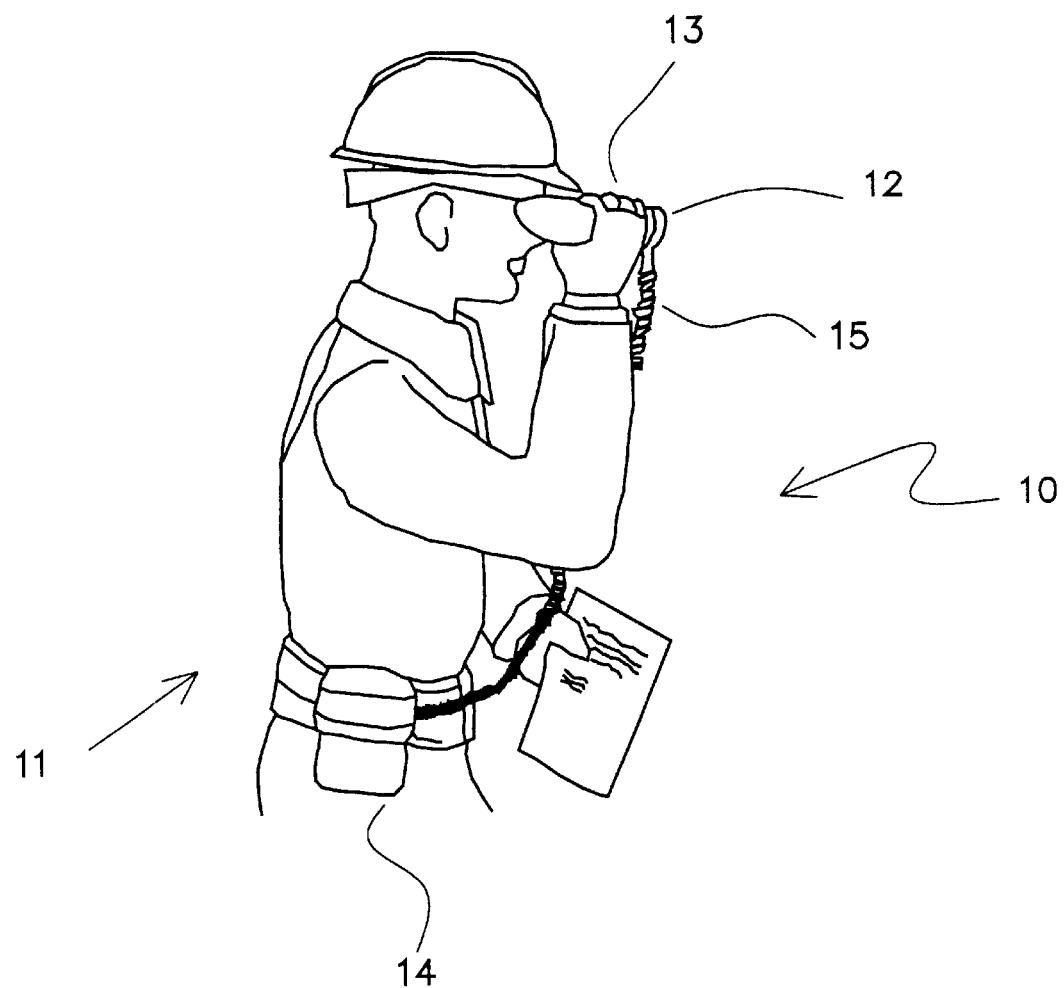
FIG. 1 is a general illustration of a user grasping a hand-held input/output display unit for use with a wearable computer unit according to the present invention.
Figure 2:
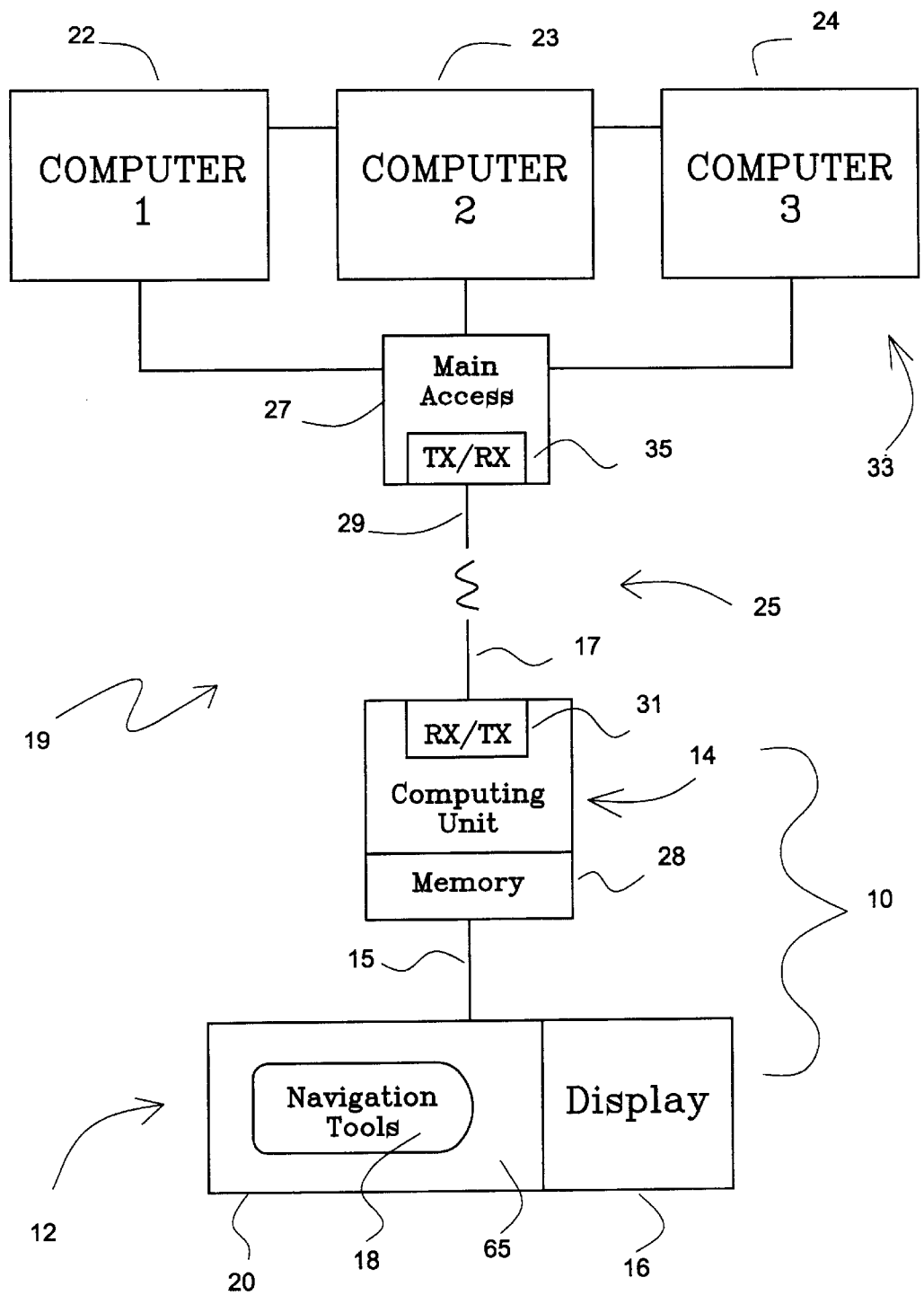
FIG. 2 is a block diagram of a personal information processing system including a hand-held input/output display unit according to the present invention.

The present invention shall be described generally with reference to FIGS. 1 and 2. Thereafter, a more detailed description of various embodiments of the present invention shall be described with reference to FIGS. 3–13.

FIG. 1 shows a user 11 grasping in the user's hand 13 a hand-held input/output display unit 12 according to the present invention. The hand-held input/output display unit 12 is used by the user 11 to view a miniature computer display integrated therein with navigational input tools for allowing the user to navigate in computer program applications being executed by a wearable computing unit 14. The hand-held input/output display unit 12 is connected to the wearable computer unit 14 by cable 15, e.g., an umbilical cable, to form operative computer apparatus 10. One skilled in the art will recognize that with use of component/packaging miniaturization and battery miniaturization, the wearable computer unit 14 may be completely integrated into the hand-held input/output display unit 12, as further described herein with reference to FIGS. 12–13. Further, the connection 15 between the computer unit 14 and the hand-held input/output display unit 12 may be wireless.

The computer apparatus 10 allows the user 11 to move about in an environment, e.g., in an industrial or processing plant environment, a military environment, an educational environment, etc., while still having access to the environment's information infrastructure. For example, in a plant environment the computer apparatus can be used by personnel, such as field operations and maintenance personnel, to enhance situation awareness, increase collaboration among and between field and control personnel, and reduce operator-induced control and communication errors in the day-to-day operations of the environment. The present invention is not to be limited to use in any particular environment as the present invention may be useful in many different environments, such as any environment where a wearable computer would provide application advantages. In particular, although the present invention is described in conjunction with applications for a processing plant environment, the present invention is clearly not limited to such an environment. Further, the present invention may be used solely as a wearable computer (i.e., including the input/output display unit having integrated navigational tools) without the computer unit having a transceiver for wireless connection.

FIG. 2 shows a personal information processing system 19 wherein computer apparatus 10 is used. The computer apparatus 10 according to the present invention includes computer unit 14 operatively connected by an electrical connection 15 to hand-held input/output display unit 12.

Generally, the personal information processing system 19 includes wireless transmission link 25 to deliver digital information from the information infrastructure 33 of the environment in which the processing system 19 is used to computer apparatus 10. The information infrastructure 33 is generally represented by the computer systems 22–24 and main access point 27. One skilled in the art will recognize that such an infrastructure may include any configuration of hardware, software, firmware, transmission links, etc., and that the present invention is limited to no particular infrastructure.

The transmission link 25 supports wireless/digital communication. Generally, the wireless transmission link or network 25 of personal information processing system 19 may be any conventional link as would be readily known to one skilled in the art. For example, the transmission link, e.g., an RF network 25, may provide a digital wireless local area network (LAN) to support data applications associated with the environment of the user 11. Further, for example, in the environment where the user is a processing plant user, seamless connectivity and a maximized transmission data rate may be required. Such is typically difficult in processing plant environments where the environment includes a large quantity of metallic structures and reinforced buildings and may require a different transmission link than is required for other environments.

In general, the transmission network 25 consists of a main access point 27 which includes electronics for functioning as an interface between a wired infrastructure 33 or network, such as is generally shown by computer stations 22–24, and the transceiver 35 of the main access point 27. The transceiver 35 is used for transmission/reception via antenna 29. For example, the electronics may convert data from Ethernet into packet data for transmission. Further, the transmission network 25 may include several repeaters (not shown) configured to resend signals transmitted from the main access point 27 to extend the range of the wireless communication link to computer apparatus 10. Yet further, the transmission network 25 includes a wireless transceiver 31 associated with the computer unit 14 worn by the user 11 allowing the user 11 to receive and transmit data through antenna 17 associated with the computer unit 14. Generally, one skilled in the art will recognize that conventional modem electronics integrated in the computer unit 14 fulfills the receive/transmit functionality.

For example, in one implementation of the transmission network, a wireless local area network (LAN) may provide for operation in the 2.4 gigahertz (GHz) industrial, scientific, and medical frequency band. The wireless LAN hardware may operate as a direct sequence spread spectrum (DSSS) system. Range of transmission of network 25 is heavily influenced by the amount and type of obstructions between the antenna 29 of main access point 27 and antenna 17 of computer unit 14 worn by the user 11. Further, such range of communication will depend on the gain of such antennas.

Transmission networks 25 are known to those skilled in the art. The summary description provided of transmission network 25 above is provided for illustration only and it will be recognized by one skilled in the art that various types of wireless transmission networks may be utilized in accordance with the present invention.

Generally, computer unit 14 may be any conventional wearable computer, such as belt-worn Windows 95 computer unit using Pentium processors and having hard disk storage, PC card interface, battery power source, etc. For example, such wearable computers are available from Via (Northfield, Minn.). However, preferably, the computer unit 14 is a wearable computer for delivering Web-based information such as a PDA processor. With utilization of a PDA processor, a smaller, lighter weight, lower cost system with better power management and longer lasting battery life is obtained. PDA processors generally have low-end power consumption and include firmware operating system's availability to eliminate the need for hard disk storage which enhances size and weight advantages.

By using Web-based information or, in other words, using a Web-based computer system, computer unit 14 can be linked easily into the environment's infrastructure 33. For example, using the Web-based system, personnel can log onto the user's Website throughout the processing plant to see the current status of activities and interact with the personnel through the Website, if necessary (such as by scheduling tasks). Further, a Web-based system provides the computer apparatus 10 with a more open development platform for use of a variety of applications and in a variety of environments. To implement the Web-based system approach, Java virtual machine (JVM) and Java-compliant Web browser technology is used on such a PDA processor.

One skilled in the art will recognize that whatever computer unit 14 is utilized, appropriate user interface software stored in memory 28 will be tailored accordingly. Further, one skilled in the art will recognize that useable computers are conventionally known in the art and shall not be described herein in any further detail. One preferred hardware computing unit is provided in the specifications of Table 1.

TABLE 1

| Operating System - Hardware Architecture | Support Java 1.1 Web Browser 800 × 600 PEL resolution for FPD Mouse support |
|---|---|
| Processing Performance | OS Java VM Java Compliant Web Browser |
| Flash | OS Storage Java VM Storage Java Compliant Web Browser Storage |
| RAM | 32 Mbytes RAM for Web page storage |
| Peripheral | Standard mouse RS232 interface Serial, parallel, or PC card interface for RF LAN |

TABLE 1-continued

| Display Drive Circuitry | Monochrome 16 gray scale SVGA 800 × 600 resolution @ 60 frames/sec |
|---|---|
| Weight | Same as radio, ~1.5 lbs |
| Size | Same as radio, ~1.5 lbs |
| Battery Life | 8 hours continuous use Rechargeable battery implementation |
| Operating Temperature | −40 to +70 degrees Celsius |

According to the present invention, the hand-held input/output display unit 12 includes a miniaturized display 16 within a housing 20. Integrated with the miniaturized display 16 in the hand-held unit 12 are navigational input tools 18 which are used in conjunction with graphical user interface software of computer unit 14 to provide a user of the personal information processing system 19 the ability to simply and easily navigate through the system. As will be described further below, various navigation input tools 18 may be used with a variety of software user interfaces to provide simple and easy-to-use navigation. The navigational input tools 18 may include any number of buttons, a single-button mouse, a two-button mouse, a three-button input interface, etc. Preferably, as will be described in further detail herein, the navigational input tools 18 may include a three-button interface, a two-button mouse, or a single-button mouse. Each of such navigational input tools 18 is integrated within housing 20 of hand-held input/output display unit 12 with the miniaturized display 16 so as to provide a rugged unit able to handle harsh environmental conditions.

The graphical user interface software stored in memory 28 is generally driven by the navigational input tools 18 integrated in hand-held input/output display unit 12. For example, a three-button interface requires the need to map data into a particular structure required for navigation with such a three-button interface, whereas the use of a single-button mouse input interface with a pointing device allows for a more standard, traditional, point-and-click type of user interface software, e.g., Microsoft Windows look-and-feel. Such user interfaces shall be described in further detail below.

Display 16 of the hand-held input/output display unit 12 may include any one of several types of displays for use with the computer units. For example, display 16 may be a direct view display, such as a direct view laptop display. However, display 16 is preferably an optically magnified miniature display, i.e., a miniature projection display including a display source with magnification optics. Such displays provide advantages over direct view displays in terms of display format size, resolution, color, and viewing contrast. Various types of display sources are available such as flat panel displays which can be used in the miniaturized projection display 16. For example, the display source may include one or more active matrix electroluminescent (AMEL) displays, organic light emitting diode (OLED) displays, ferroelectric displays (FEDs), or active matrix liquid crystal displays (AMLCDs). Each have their own advantages and disadvantages as is known to one skilled in the art. Preferably, however, due to their commercial off-the-shelf availability, the display source of display 16 is an off-the-shelf miniature 35 millimeter format AMLCD.

The flat panel display is driven with magnification relay optics. The magnification can be accomplished in a number of manners. For example, by including an optical beam splitter in the design, the displayed image could be overlaid on the direct see-through image through the beam splitter (i.e., a see-through design). Preferably, however, for simplicity purposes, the image is routed from the display directly to the eye, resulting in a so-called see-around design. The see-through design is advantageous in that it allows direct comparison (even 1:1 geometric registration, as appropriate) of a scene versus a displayed image, which may be useful for a variety of applications, e.g., for setting complex switchboards or wire harness layout in a manufacturing process plant. However, because of such viewability more display brightness is required and thus battery usage is problematic.

One skilled in the art will recognize that any number of miniaturized projection display configurations may be used in accordance with the present invention. As such, the illustrative configurations described herein are not to be taken as limiting to the present invention.

The present invention shall be further described with respect to a particular configuration of the computer apparatus 10 shown in FIGS. 3–7 and further used in conjunction with a graphical user interface shown and described with reference to FIGS. 8A–8B. As previously described with reference to FIGS. 1 and 2, computer apparatus 10 includes a processing unit 14 and a hand-held input/output display unit 12 electrically connected thereto by transmission cable 15.

Figure 4:
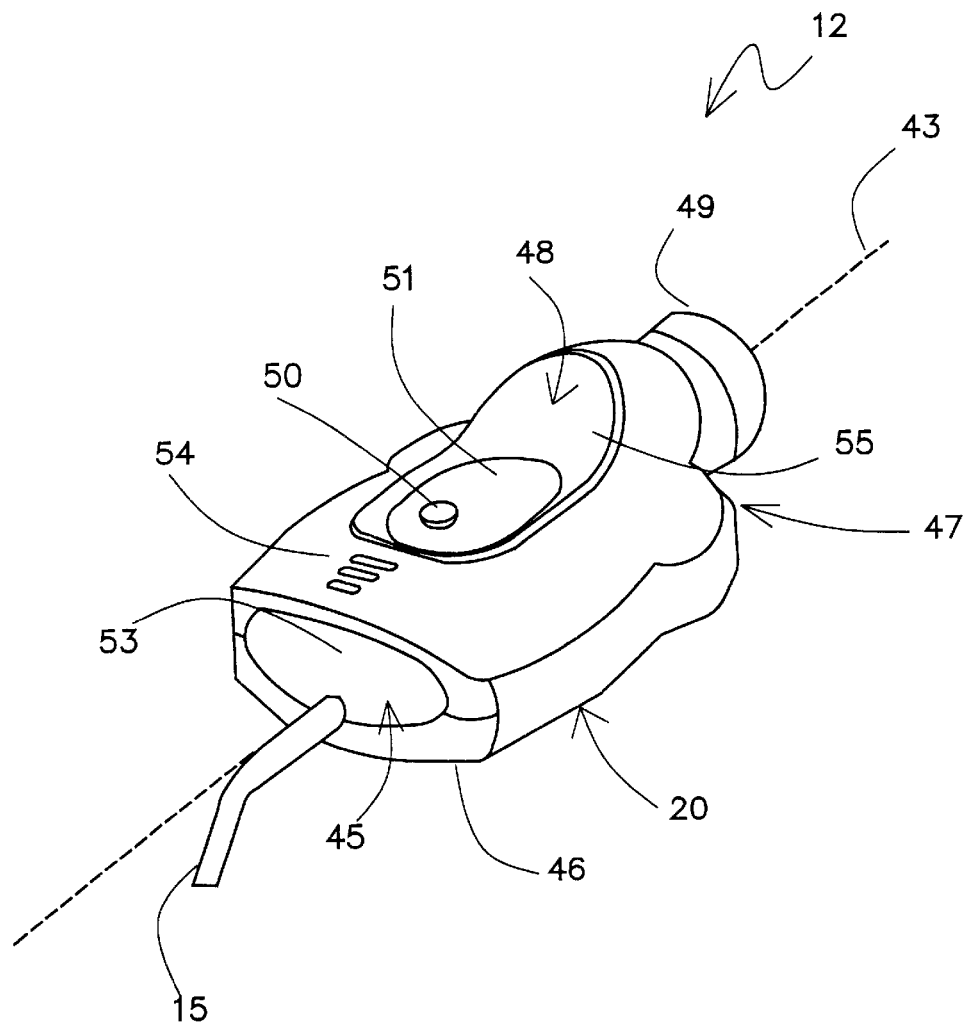
FIG. 4 is a perspective view of one illustrative embodiment of the hand-held input/output display unit of FIG. 1 according to the present invention integrating a single-button mouse with a display in the unit.

As shown in the perspective view of FIG. 4, the hand-held input/output display unit 12 includes a longitudinal axis 43 about which a housing 20 encloses components of the hand-held input/output display unit 12. The longitudinal axis 43 extends through the housing 20 from a first end 45 to a second end 47. An upper surface 44 extends from the first end 45 to the second end 47. Likewise, a bottom surface 46 extends from the first end 45 to the second end 47 of a hand-held unit 12. The housing 20 further has an eyepiece 49 integrated with the housing 20 at the second end 47 of the hand-held unit. At the opposite end, e.g., end 45, a recessed finger well 53 is provided such that when the user 11 grasps the hand-held unit 12, the user's little finger is positioned in the recessed finger well 53 for stabilization of the unit 12 next to the user's eye. The housing 20 further includes a navigational tool recess 55 wherein are positioned and integrated within housing 20 navigation tool interface 48. In this particular embodiment of the hand-held unit 12, the navigational tools include a force-actuated single-button mouse including a mouse pointer actuator 50 and a single-button actuator 51. The housing 20 further includes microphone openings 54 for access to a microphone.

The housing 20 and the navigational tool interface 48 are configured for holdability. In other words, the design is such that a gloved hand can hold and operate the navigational tool interface 48. In the configuration of FIG. 4, the top-mounted integrated single-button mouse is provided for navigation of the system. The forefinger of the user's hand operates the button actuator 51 and the middle finger of the user's hand operates the pointer actuator 50.

Figure 5:
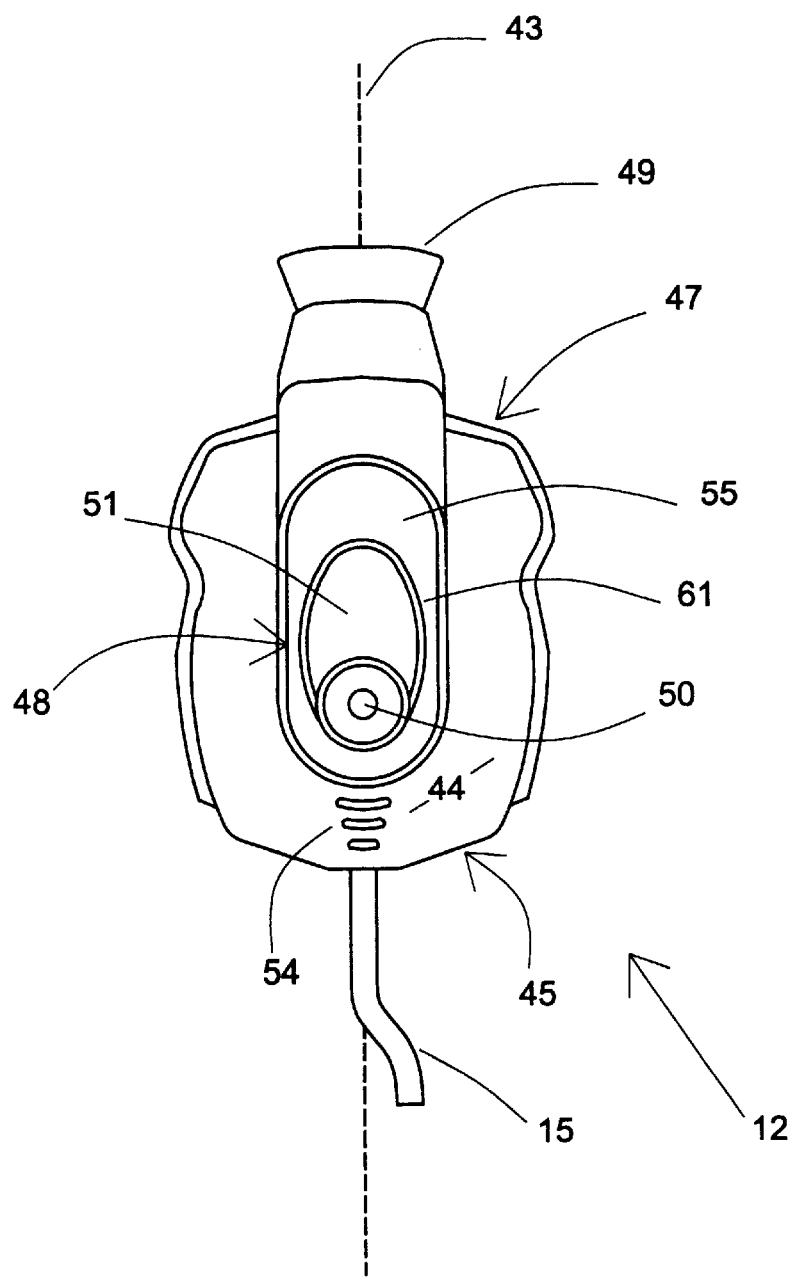
FIG. 5 is a top view of the hand-held input/output display unit of FIG. 4.

FIG. 5 shows a top view of the hand-held unit 12 further showing the navigational tool interface 48, eyepiece 49, upper surface 44, navigational tool recess 55, and microphone opening(s) 54. The single-button mouse generally lies below a ruggedly constructed surface layer 61 to provide for use in harsh environments.

Figure 6:
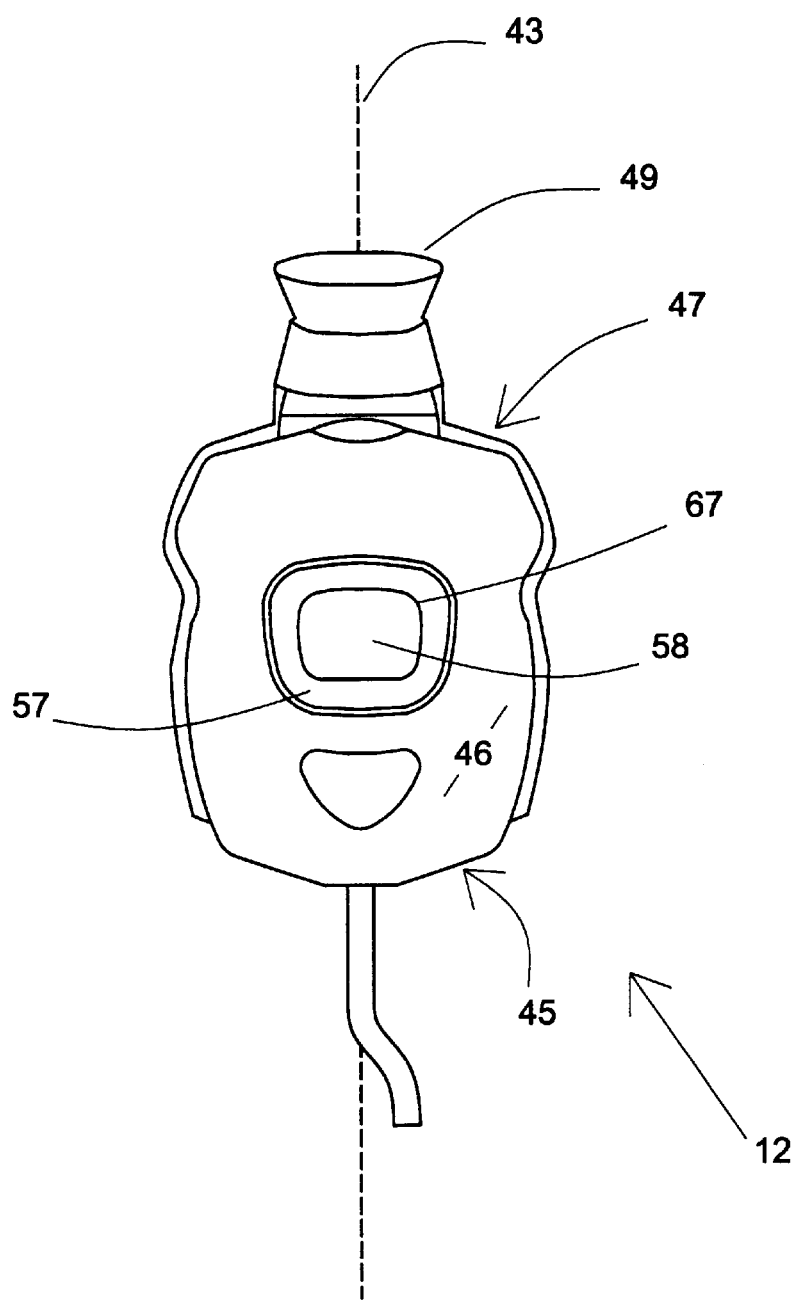
FIG. 6 is a bottom view of the hand-held input/output display unit of FIG. 4.

FIG. 6 is a bottom view of the hand-held unit 12 and further shows in detail eyepiece 49 and bottom surface 46. Bottom surface 46 includes a recessed thumb well 57 that includes an integrated switch 58. The switch 58 is positioned below a ruggedly constructed surface cover layer 67 such that when the user grasps the hand-held unit 12, the user's forefinger is over the button actuator 51, the user's middle finger is over the pointer actuator 50 while the user's thumb is positioned within recessed thumb well 57 and able to actuate switch 58. Further, the user's pinkie finger is positioned in recessed finger well 53, e.g., a back ledge ridge. The overall configuration including the recessed features, in addition to providing for integration of the navigational input tools with the display 62 in the hand-held input/output display unit, also provide to assist in the positioning of the user's hand over the single-button mouse and to stabilize grip support.

The switch 58 actuated by the thumb of a user is a safety switch which may be used to prevent accidental navigational input tool actuation, such as during positioning of the unit 12 away from the eye, e.g., holstering of the device in a holder at the user's side. In such a case, continuous pressing of the switch allows for use of the navigational tools while the switch is pressed. Further, the safety switch 58 serves to conserve power. In one conservation of power mode, the switch must be actuated prior to power being supplied to the device. Further, the switch 58 can be made operable to only provide power upon continuous holding of the switch 58 or can be made operable to provide continuous use of the mouse within a predetermined timeout period once the switch 58 has been activated.

Figure 7:
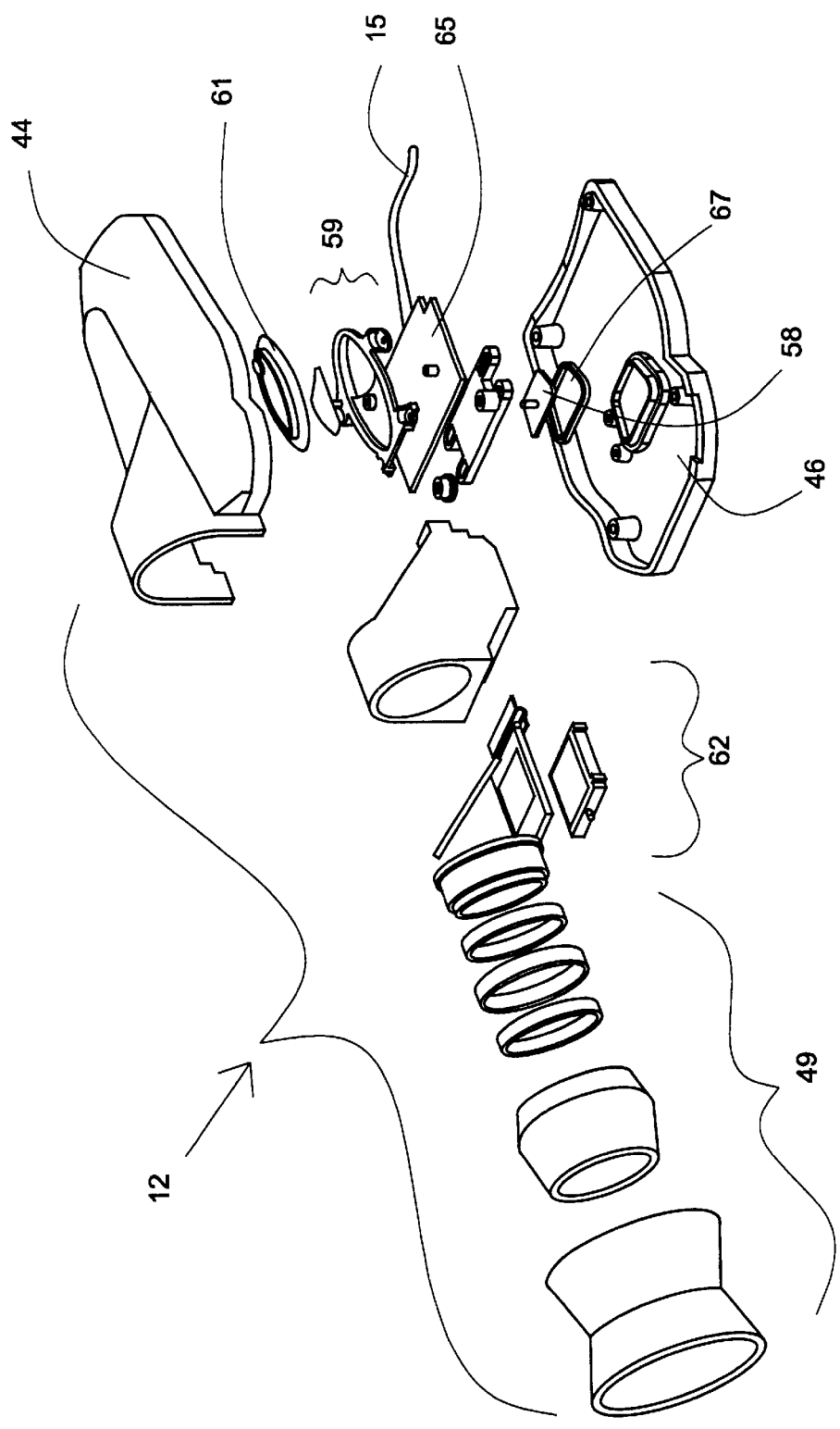
FIG. 7 is an exploded view of the hand-held input/output display unit of FIG. 4.

FIG. 7 shows an exploded view of the hand-held input/output display unit 12 including components of one particular illustrative configuration. In this particular configuration, the hand-held monocular input/output display unit 12 integrates single-button mouse components 59 with an off-the-shelf miniature 35 millimeter format AMLCD display 62. The display components include a miniature flat panel monochrome Sony display available under the trade designation LCX016L. The flat panel display shown generally as the grouping of display components 62 is an 800×600 pixel (SVGA) display using a Sanyo cold cathode-type fluorescent backlight. With the proper polarizers and drive signal format, this device is capable of 256 gray levels and 200:1 contrast ratio performance. An air-spaced double achromatic doublet objective lens is configured according to the specifications shown in Table 2 below.

TABLE 2

| Relay Optics Design Specifications | |
| --- | --- |
| Field-of-View | 25 degree H × 20 degree V |
|  | 30 degree diagonal |
| Monocular Field-of-View | 25 degree H × 20 degree V |
| Resolution | 800 × 600 24 μm pixels |
| Nyquist Acuity | ~20/37 for the Sony AMLCD |
| MTF | Between 0.1 and 0.3 at 15 cyc/mm |
| Minimum Eye Relief | 32 mm |
| Exit Pupil | 10 |
| Accommodation | 1.0 m |
| Field Curvature | ±0.25 diopter |
| Distortion | <5% |
| Image Source Active Area | 20 mm × 26.6 mm |

The display 62 is positioned within the housing 20 so as to be viewable through eyepiece 49 which includes the grouped components illustrated generally in FIG. 7.

One skilled in the art will recognize that the present invention is not limited to a monocular-type device but may be binocular as well. However, to preserve size and weight, a monocular device is preferred.

The exploded view of FIG. 7 further illustrates the top surface 44 and the bottom surface 46 of the housing 20 which substantially encompass the components of the unit.

A single component containing board 65 includes the electronics necessary to drive the display 62 using a corresponding Sony driver chip set. The single board 65 allows for incorporation of the single-button mouse 59 generally represented by the exploded grouped components of force-actuated single-button mouse. For example, the mouse may be a Hula Point™ Hall effect mouse pointing device made by USAR Systems, Inc., (New York City, N.Y.), operatively coupled to board 65 to provide mouse signaling to computer unit 14. Tactile rebound feedback for the mouse disk of the single-button mouse 59 is provided by the elastomeric properties of the molded cover or surface layer 61. Further, a single-shielded 11 conductor curly cable with a standard 15-pin D PC display connector completes the hand-held unit 12 to connect the hand-held input/output display unit 12 to the computing unit 14.

Further shown in FIG. 7 is the switch 58 which is provided with flexible cover 67. The switch 58 is further operable with the single board 65 to provide switch signals to computer unit 14. Switch 58 is a standard switch such as a C&K pushbutton switch available from DigiKey (Thief River Falls, Minn.).

Figure 3:
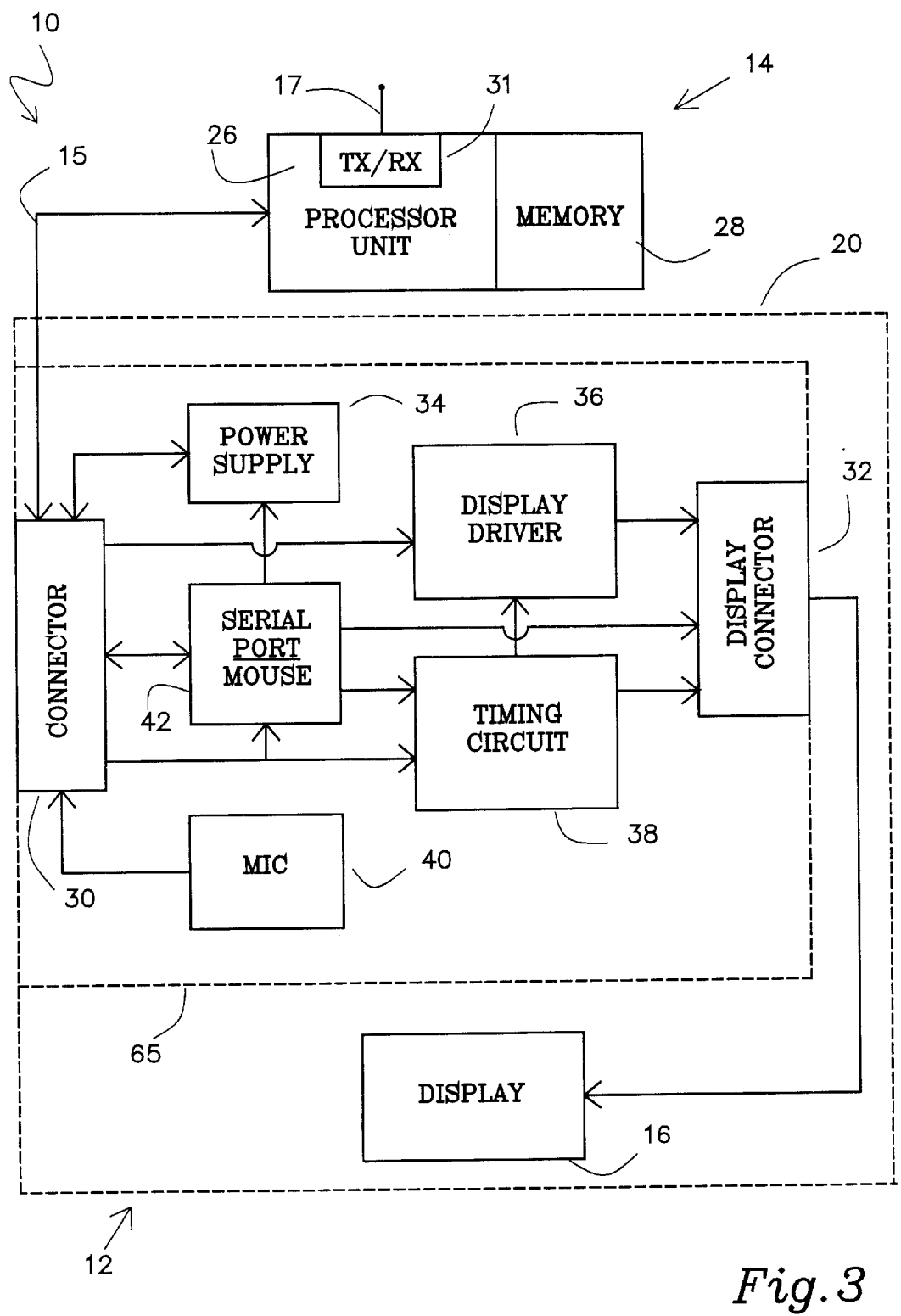
FIG. 3 is a block diagram of one embodiment of the hand-held input/output display unit of FIG. 1 useable with a separate wearable processing unit.

The single board 65 is used for mounting and/or integrating the components and connectors as shown in FIG. 3. The circuitry contained within the housing 20 of hand-held input/output display unit 12 includes circuitry for communication to processing unit 14 through connector 30 and for providing the information for driving display 16 through display connector 32.

The board 65 housed in the hand-held input/output display unit 12 includes a power supply component 34, serial port/mouse component 42, microphone 40, display driver 36, and timing circuit 38. Power supply component 34 receives power through connector 30 and controls power to the hand-held input/output display unit 12. For example, power supply component 34 provides for reset of the components of hand-held unit 12 and also for control of power supply to display unit 12 upon actuation of switch 58. Power supply component 34 does not provide power to the display unit 12 unless the switch 58 has been actuated. Further, power supply component 34 is turned off upon activation of a sleep mode when display unit 12 has not been utilized for a particular period of time as determined by timing circuit 38.

Serial port/mouse 42 provides for the interface between the single-button mouse user interface 48 including force-actuated pointer 50 and button 51 and the computer unit 14. As operation of such conventional single-button mouses are known to those skilled in the art, details with respect thereto will not be provided. The serial port/mouse 42 provides pointing signals and button actuation signals through connector 30 to computing unit 14 for use in control of the graphical user interface software for the system, e.g., stored in memory 28. The serial port/mouse 42 may further include a motor for providing vibration for notification purposes such as in a paging situation, or may further include an audible alert such as a piezoelectric buzzer. In addition, the serial port/mouse 42 may include a beeper for such notification purposes.

Display driver 36 and timing circuit 38 provide adequate signaling through display connector 32 to display 16 for displaying information from computing unit 14 input to hand-held unit 12 through connector 30. Timing circuit 38 provides for sync signals to synchronize display 16 with the display driver 36. As previously described, such components are off-the-shelf components utilized in conjunction with the displays, such as those available from Sony, and will not be described in further detail.

Microphone 40 is generally representative of one or more microphones positioned within the housing 20. For example, the microphones may be used for voice activation of the computer unit and/or voice input to the system. As the handheld device is held in close proximity to the mouth, voice activation may be readily accomplished. Further, a microphone may be positioned relative to the upper surface 44, e.g., microphone openings 54, and another microphone may be positioned relative to the lower surface 46, to provide multiple inputs, e.g., one voice input and one environment input, for carrying out noise reduction and/or interference processing using such multiple inputs, e.g. common mode noise rejection. The display unit may include any additional circuitry necessary for processing or conditioning of such inputs.

With use of the direct manipulation input device, e.g., the single-button mouse interface 58, a look-and-feel similar to that of conventional graphical user interfaces can be implemented, for example, a Windows 95-type look-and-feel. The application software may be any of a number of applications applicable to a particular environment such as maintenance applications for a processing plant, e-mail functions, etc.

The personal information processing system preferably is used with an environment infrastructure having applications written in Java. With the applications written in Java, a dedicated server for the environment can provide up-to-date information to the user 11 of the computer apparatus 10 according to the present invention. For example, a dedicated server may access near real-time process data from a refinery history module which provides historical data regarding the plant's processing history and may also access relational databases that store refinery or plant procedures, task schedules, and personnel information. It should be readily apparent that various applications may be utilized in accordance with the present invention and in no manner is the present invention limited to use with or for applications involving a processing plant, e.g., a refinery, a pulp mill, etc. One example of application software used by a field operator is in part shown in the FIGS. 8A and 8B.

As is typical with many software systems, an opening screen requires a user to log onto the system and enter any other relevant data, e.g., current job, password, etc. Once logged onto the system, the user 11 can navigate using a point-and-click feel with a traditional pull-down menu graphical user interface as shown in display screen 81. Such a graphical user interface useable with a single-button or two-button mouse is known to those skilled in the art and will not be described in detail. In addition to the traditional pull-down menu interface, the user can navigate to different applications using one of the taskbars 80 located at the bottom of the screen 81. For example, the "View Todays Tasks" bar as shown in FIG. 8A displays all scheduled tasks 85 assigned to the employee's logged-on position for the current shift when selected, as shown in screen 81 and 86 of FIGS. 8A and 8B.

One benefit to on-line interactive procedures is that the procedures can be made more context-sensitive. For example, in a processing plant environment, as shown in FIG. 8B, by displaying live process data right inside a procedure step and allowing outside operators to enter outside readings directly from the field, one provides a more context-sensitive procedure. Conventionally such a procedure required operators to call in readings to a central control room operator to ensure that the control systems readings of those levels were calibrated with the manual readings displayed in the field. With the present system, outside operators can see live process data, precluding the need to bother the central control room operator.

Figure 8A:
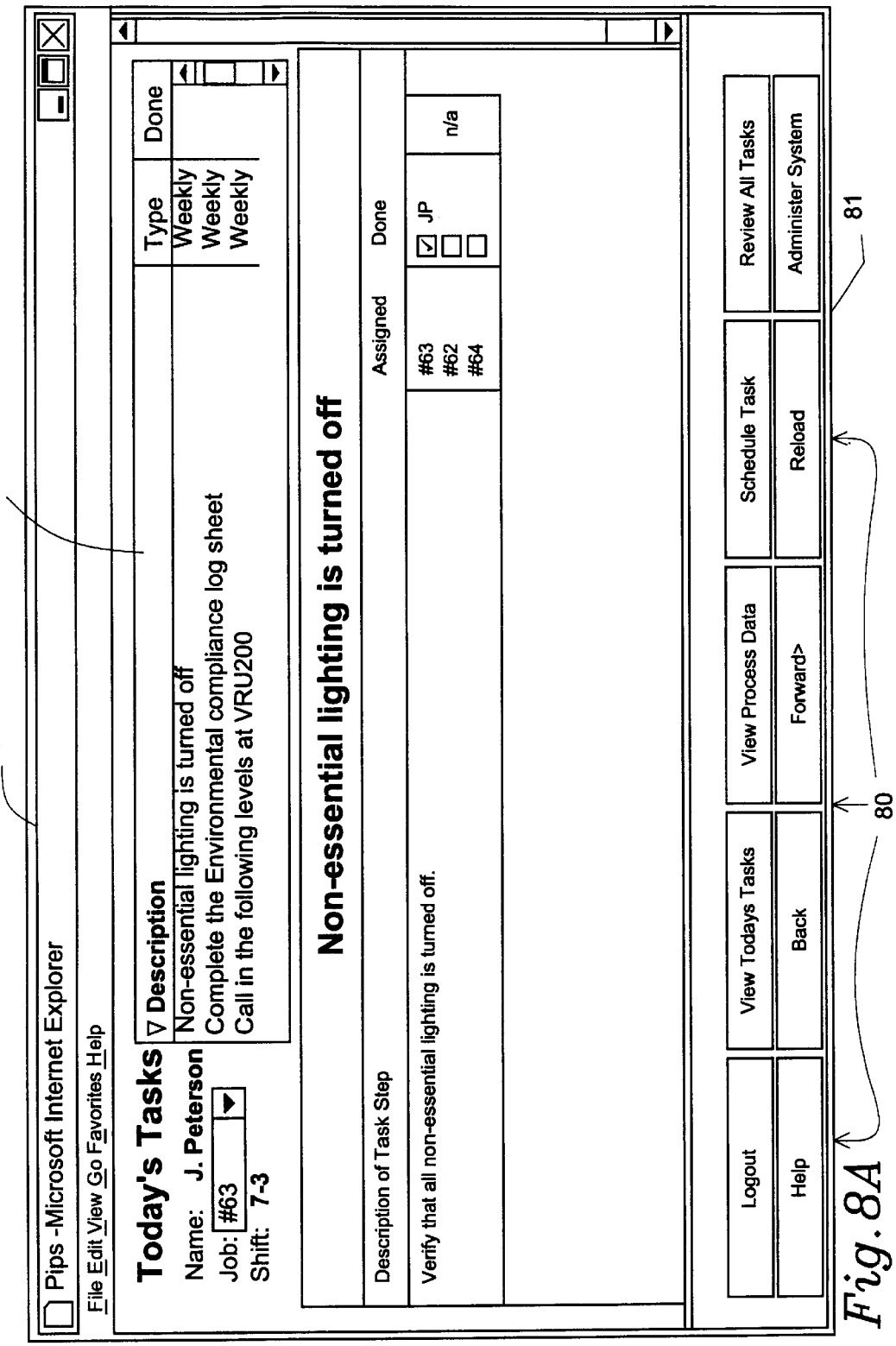

Further, as shown with regard to FIG. 8A, the user 11 can select "Schedule Tasks" to navigate to different days and shifts to see what is scheduled and what has been completed in the past. The "Review All Tasks" option may allow operators to review any procedure entered into the system as opposed to viewing today's tasks and being able to sign-off or change such tasks. The "View Process Data" option may allow a user to select and view any process data point in the plant, i.e., receive information from the dedicated server allowing access to historical data and current information concerning the plant operation. Further, the system has navigation buttons similar to most browsers (Back, Forward, and Reload) as well as a context-sensitive help system which provides help relative to the current screen being displayed when the Help button is selected. As represented by taskbar 82, the system is a Web-based system. In this particular case, Microsoft Internet Explorer is used for communication.

Figure 9:
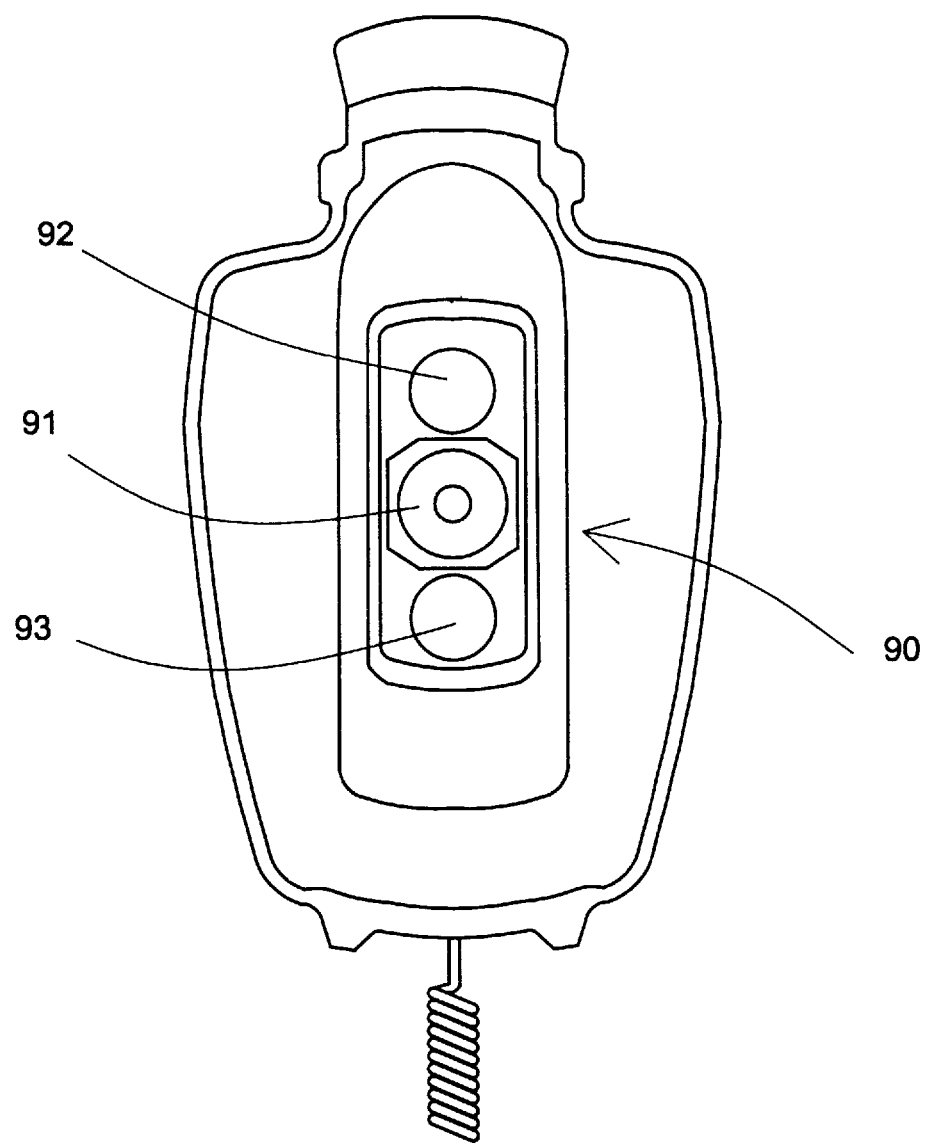
FIG. 9 is a top view of an alternate embodiment of the hand-held input/output display unit of FIG. 1 according to the present invention integrating a two-button mouse with a display in the unit.

One skilled in the art will recognize that a two-button mouse 90 may be integrated with the display 16 in the hand-held input/output display unit 12. A top view of the two-button mouse interface 90 is shown in FIG. 9. With the use of an additional button actuator, the hand-held unit 12 may become slightly longer. The two-button mouse 90 includes a pointing actuator 91, a right button actuator 92 and a left button actuator 93. Such mouse structures are integrated into the unit 12 in much the same way as described with reference to FIGS. 3–8. The two-button mouse user interface 90 may be used with similar graphical user interface software (i.e., a Windows-type look-and-feel) as described with reference to FIGS. 3–8.

As described above, the navigational input tools, i.e., the single-button mouse and the two-button mouse configurations, utilize a graphical user interface that generally relies on the standard Microsoft Windows look-and-feel, which basically requires either a full keyboard or mouse, a trackball, pen input device, or the like. Generally, such interfaces require interactions involving control buttons, drop-down menus, dialogue boxes, and multiple, simultaneously opened-tiled windows. This conventional type of graphical user interface was generally designed for desktop computers and such user interface is fully supported by the wearable computer apparatus 10 according to the present invention. However, in many cases, depending upon the nature of the interface environment, the graphical user interface and navigational input tools (i.e., user interface) may need to be made simpler for navigational control of software applications in such environments. Such environments may require a minimal amount of distraction or attention.

Figure 10:
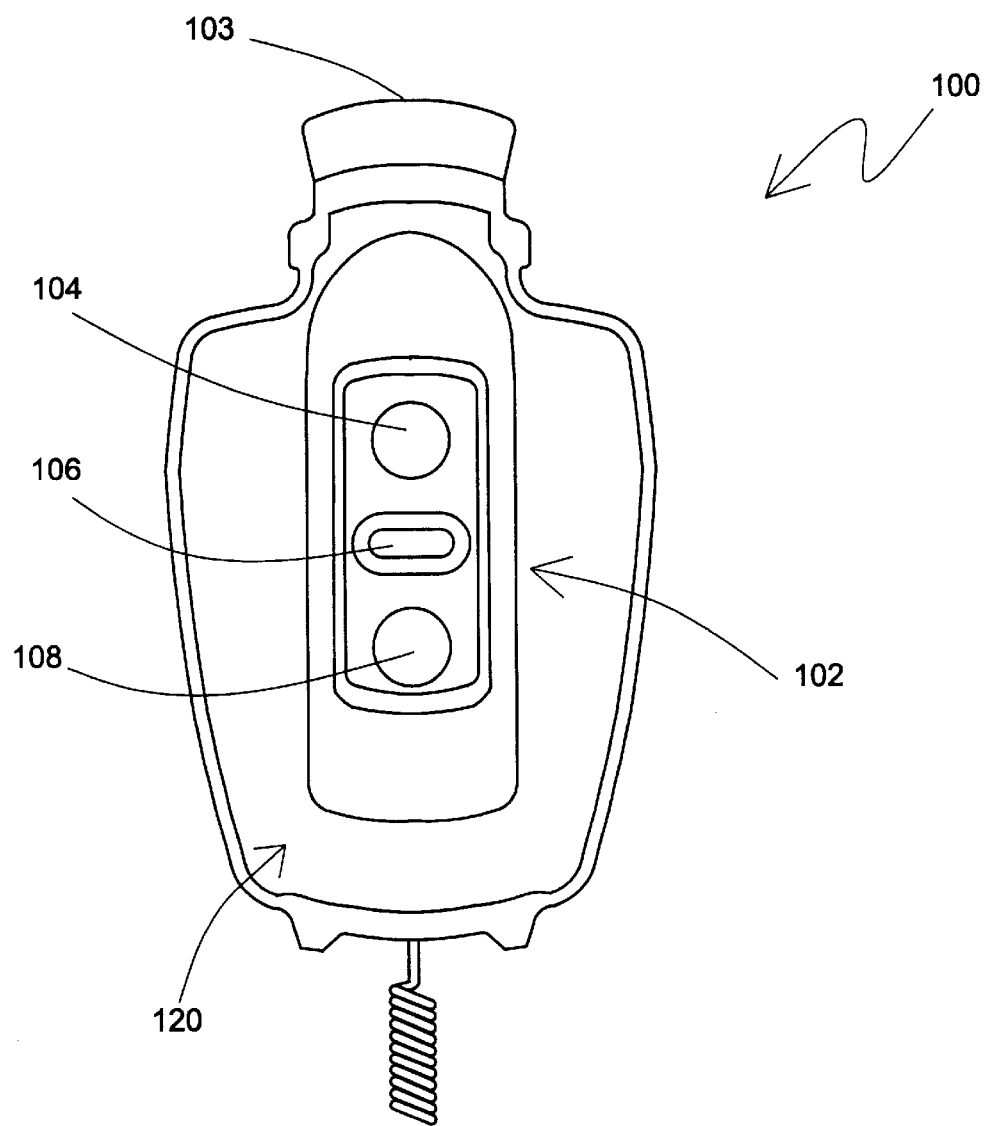
FIG. 10 is a top view of an alternate configuration of the hand-held input/output display unit of FIG. 1 according to the present invention integrating a three-button user interface with a display in the unit.

A user interface which provides such simplicity shall be described with reference to FIGS. 10–11. The configuration for hand-held input/output display unit 100 shown in FIG. 10 includes a three-button user interface 102. The three-button interface 102 is integrated with a display (not shown) viewable through eyepiece 103 in housing 120 in substantially a similar manner to that previously described with reference to FIGS. 3–8 with the exception of an additional button as opposed to a pointing device. As shown in FIG. 10, three-button user interface 102 includes an Enter button 106 positioned in the middle of Up and Down buttons 104, 108. In other words, the Up and Down buttons 104, 108 are positioned on either side of middle Enter button 106.

The three-button interface 102 is used with a software graphical user interface implemented from memory (e.g., memory 28, FIG. 2) of the computer unit to implement a simple user interface. Generally, the interface environment includes only a single window open at a time, a simple pop-up navigation menu with application menu items and context-sensitive menu items, and other simple interface elements which will be described in further detail with reference to FIGS. 11A–11J. This user interface provides a look-and-feel that is substantially different than a Microsoft Windows-type look-and-feel.

Generally, navigation in the system using the graphical user interface and the navigational input three-button user interface is performed either using a pop-up menu to navigate between display screens wherein the pop-up menu includes at least application menu items and context-sensitive menu items, or follows a tree structure or a circular structure further described below to navigate within a particular application. The look-and-feel for the interface uses a variation of a hierarchical file view for screen navigation and control, which is very suitable for an up/down/select navigational input approach. Likewise, by clustering all control objects on a single pop-up menu with context-sensitive menu items, an inter-screen navigation scheme which is well-suited to a three-button interface input approach is created.

The graphical user interface software was authored in Visual Basic. The ability to navigate from one Visual Basic screen to another creates an almost scrolling functionality for the look-and-feel of the graphical user interface. For example, as further described below, a user 11 is able to move through a series of trend screens representing different processing plant devices with an almost scrolling effect. The user interface design used a general mapping of application information requirements to the three-button interface hardware. It will be readily apparent to one skilled in the art that the user interface described herein may be used with any applications and are not restricted to processing plant applications described illustratively herein. For example, a processing plant is the location or facility at which the hand-held input/output display unit 100 is to be used and the applications pertaining to such a processing plant may include applications relating to personnel, maintenance, processes, procedures, e-mail. In accordance with the present invention, other applications with regard to other facilities, locations, or any other environments may benefit from the user interface look-and-feel as described herein.

The Up and Down buttons 104, 108 are single-button function buttons. However, the Enter button 106 positioned between the Up and Down buttons 104, 108 is a multi-function button. By pressing and holding the multi-function Enter button a pop-up menu is called. Once the pop-up menu is displayed on the screen, the user 11 can navigate up and down the menu by use of the Up and Down buttons 104, 108. The multi-function Enter button 106 can then be used to select an option of the pop-up menu by pressing and releasing or, in other words, clicking the Enter button 106.

One skilled in the art will recognized that the multiple functions of the Enter button can be provided in a number of manners. For example, one function may be provided by clicking the button whereas another function may be provided by pressing and holding the button as described above. Further, the multiple functions can be provided by clicking and double clicking. As used herein, pressing and holding is encompassing of other manners of providing a function other than simple single clicking, e.g., pressing and holding encompasses double clicking or any other actuation technique other than the single click.

To describe the graphical user interface in conjunction with the navigational input tool interface, i.e., the three-button user input interface 102, the display screens shown in FIGS. 11A–11J shall be described with respect to a particular illustrative processing plant environment and illustrative applications used in such an environment. As previously indicated, the data and applications used in describing this interface look-and-feel are for illustration only and various other environments and applications relating thereto may benefit from the look-and-feel described herein. It will be noted that all interaction with the interface to be described with reference to FIGS. 11A–11J can be accomplished with the three-button interface 102 (i.e., mouse and keyboard are not required).

Figure 11A:
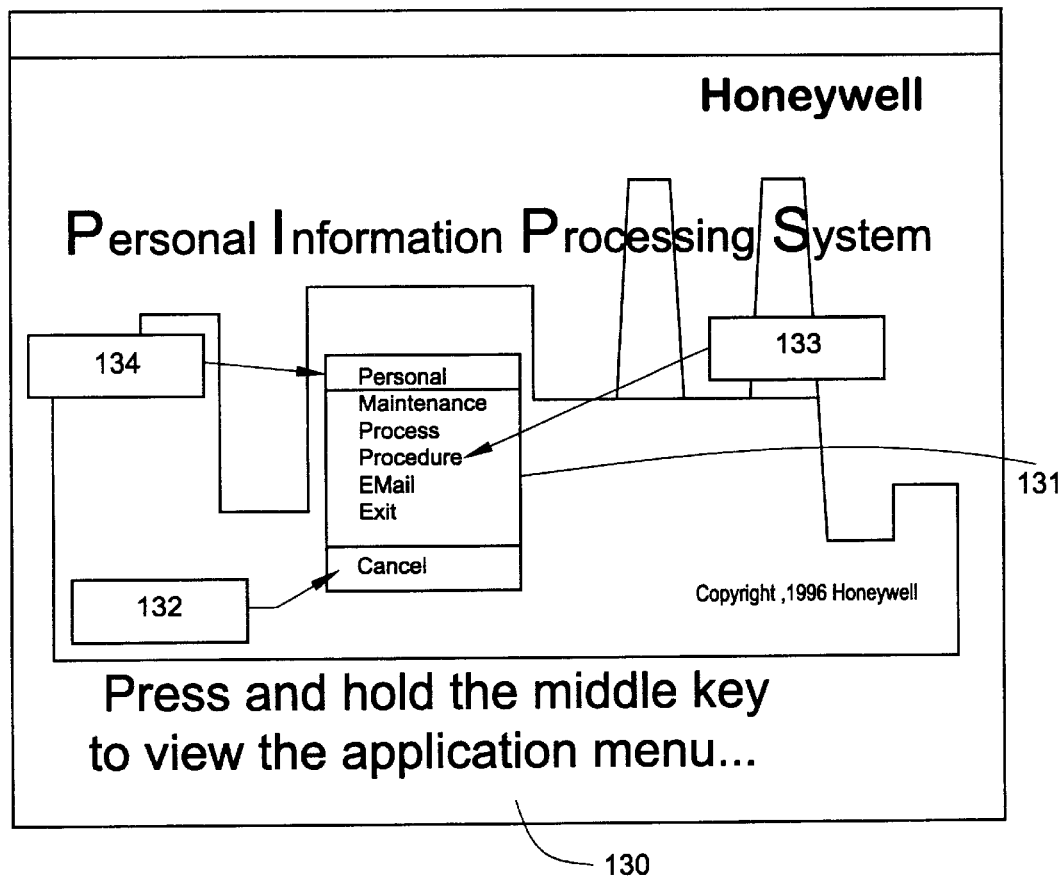
FIGS. 11A–11J are display screens used for describing a graphical user interface in conjunction with the three-button user interface of FIG. 10 according to the present invention.

FIG. 11A shows a splash display screen 130 which occurs at start-up. Upon start-up, the splash display screen 130 does not include pop-up menu 131. Pop-up menu 131 is invoked by pressing and holding the middle Enter button 106. The pop-up menu 131, at this point in the user interface, includes only application menu items 133 and a cancel option 132. The cursor 134 shown by the highlighted Personnel menu item moves up or down the menu and includes wrap-around with use of the Up and Down buttons 104, 108. Selection of an application from the pop-up menu 131 is accomplished by pressing and releasing, i.e., clicking, the Enter button 106 with the cursor 134 highlighting the application menu item. Selection of an application option dismisses the splash display screen 130 and launches an application window associated with the application selection. The cancel option 132 is the default position when the pop-up menu is displayed. Selecting the cancel option 132 serves to cancel the pop-up menu display, for example, in the case where the user called up the menu by accident or decided to go back to the previous screen that was being used.

Figure 11B:
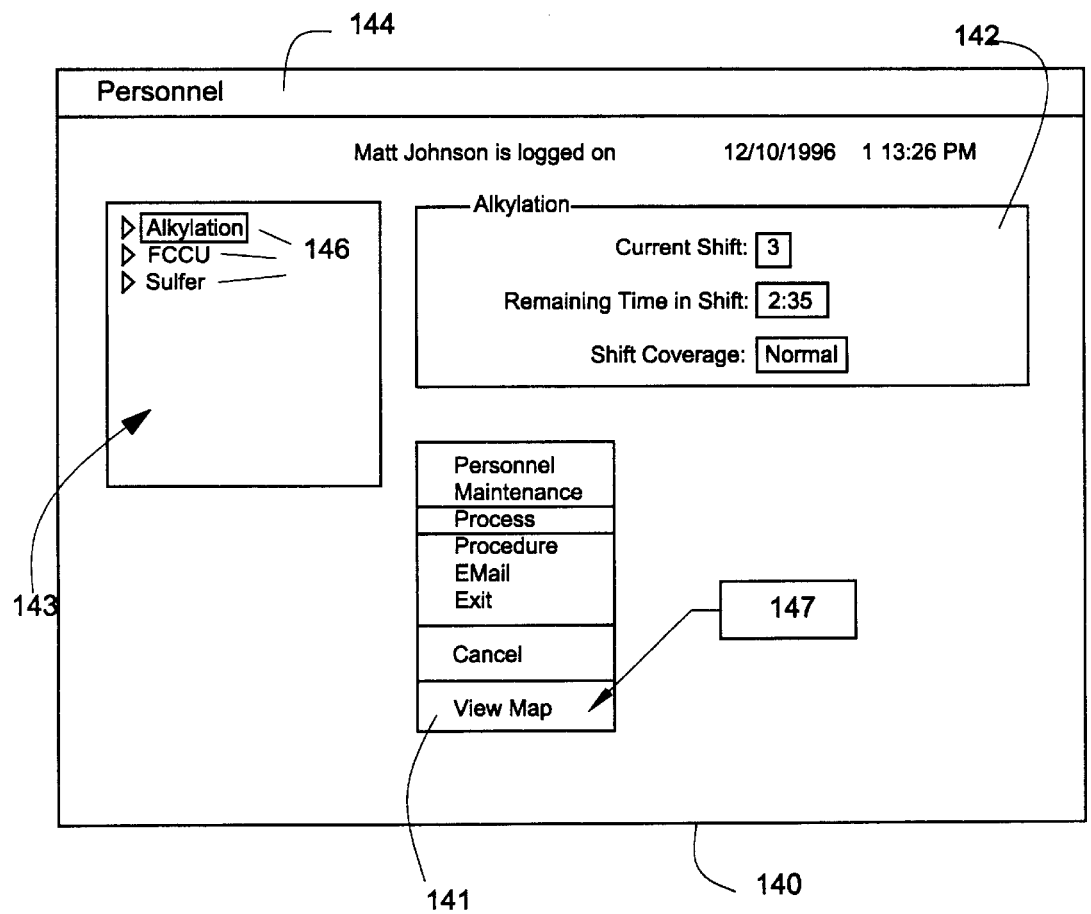

FIG. 11B shows a display screen 140 which is the main application window for the Personnel application selected from splash screen 130 of FIG. 11A. Cursor movement in the main window 140 for this application and for other applications is limited to the information tree 143 at the left side of the display screen 140. The information tree 143 includes, for example, personnel information with respect to various processes. At this junction, the information tree 143 is shown only in its highest level including only top-level tree items 146. Details regarding the tree item highlighted by the cursor is provided in a display area 142 to the right of the tree 143. In this display screen 140, the lower level tree items are currently hidden. The window title bar 144 provides the user 11 with information regarding the identification of the current application in which the user 11 is operating, i.e., Personnel. Generally, the display screen 140 does not include the pop-up menu 141 until the Enter button 106 is pressed and held.

The pop-up menu 141 displayed with the main window display screen 140 of the Personnel application includes one or more application-specific context-sensitive menu items 147 on the bottom of the pop-up menu 141. Such context-sensitive menu items 147 are dependent upon the application in which the user is operating. The context-sensitive menu items will be described further below.

Figure 11C:
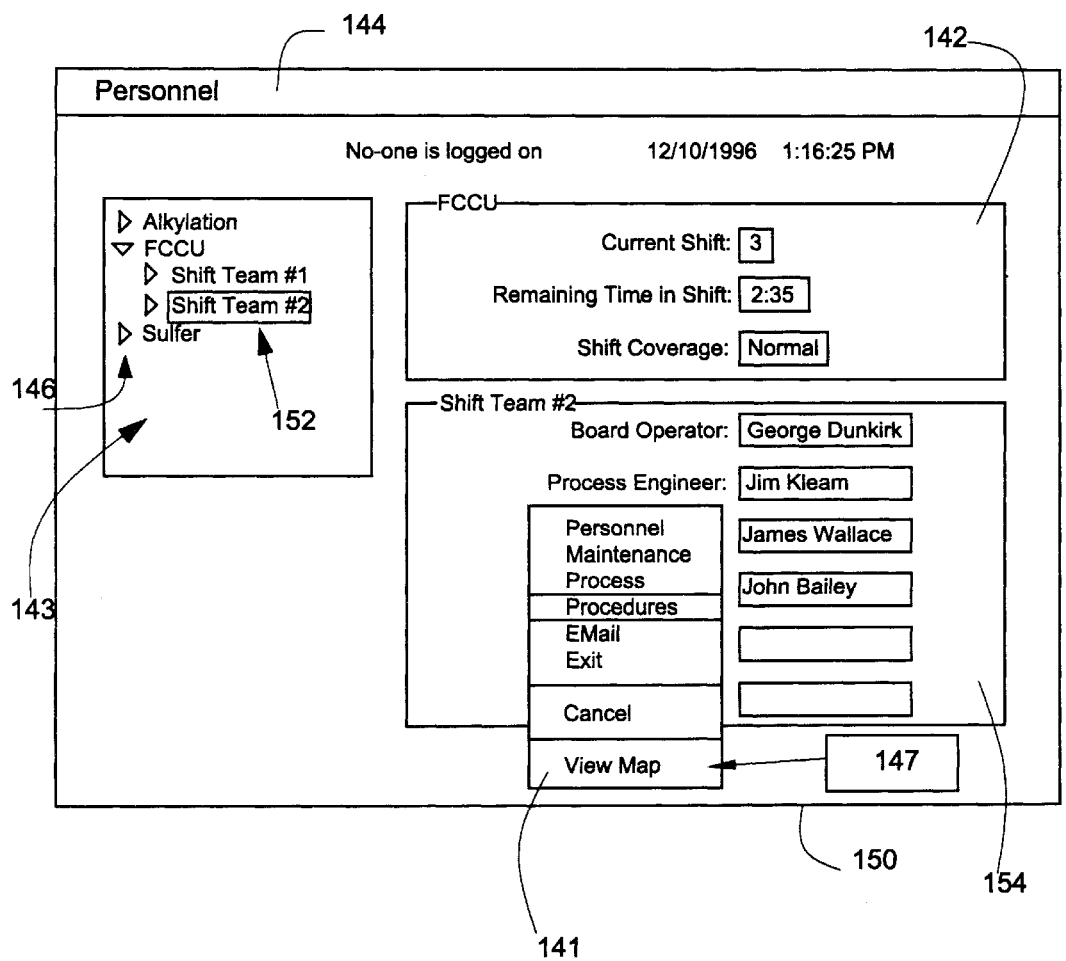

FIG. 11C shows a main window display screen 150 for the Personnel application but shows mid-level details 152 with regard to a selected top level tree item 146. The next level of the tree is selected by pressing and releasing, e.g., clicking, the Enter button 106. Selection of an alternate top level tree item 146 in the information tree 143 hides the currently exposed mid-level detail and exposes the mid-level detail for the newly selected top level tree item 146. Display screen 150 shows information tree 143 with the second level detail 152 exposed or, in other words, one of the top level tree elements 146 expanded. Note that the triangle in front of the top level tree element expanded rotates when the detail is exposed. Display screen 150 further shows a display area 154 for the mid-level tree item highlighted by the cursor. The top level tree display area 142 is displayed with the mid-level tree display area 154. Once again, the pop-up menu 141 will not be displayed unless the Enter button 106 is pressed and held to initiate display of the pop-up menu 141.

Figure 11D:
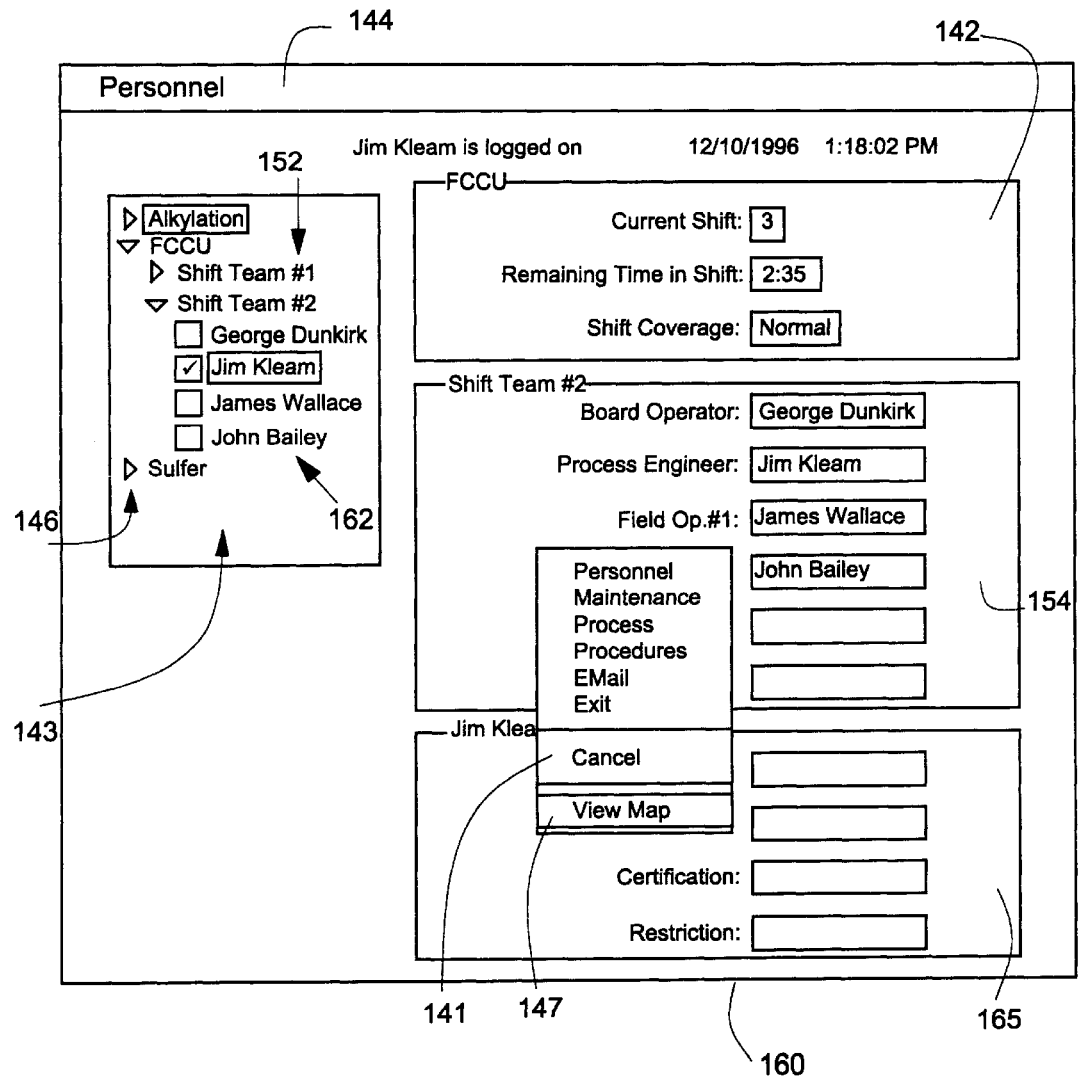

FIG. 11D shows an additional level 162 of tree detail for information tree 143. The additional level 162 of tree data detail is exposed by selecting a second level tree item 152. Display area 165 is used to show information with regard to this additional level 162 of information tree 143 along with the display areas 154 for the second level and display area 142 used to display information of the top level tree item. As noted by the boxes next to the items of the additional level 162, various other functional or procedural items may be added for use by the user such as selecting certain personnel or marking that procedures have been accomplished, or various other simple input elements. Once again, display screen 160 is generally shown without the pop-up menu 141 unless the middle Enter button 106 is pressed and held as previously described.

Figure 11E:
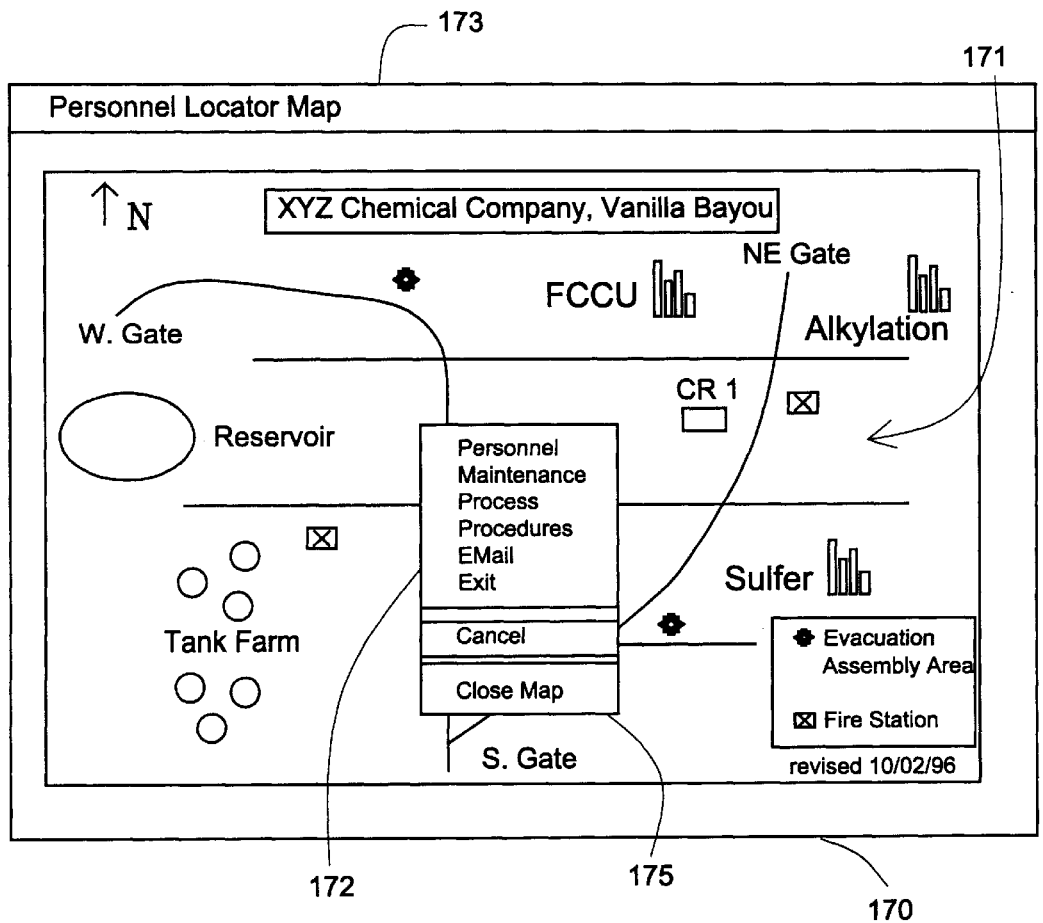

Upon selection of context-sensitive menu item 147 of pop-up menu 141 from display screen 160, a secondary window is provided on display screen 170 as shown in FIG. 11E. In this particular circumstance, the context-sensitive menu item is a "View Map" menu item which, when selected, provides a map of the facility or environment where the user 11 is located, designated generally as reference numeral 171. It should be recognized that other context-sensitive menu items may provide additional display screens with regard to other personnel-related matters. For example, global positioning may be used to give absolute position of the user 11, maps showing position of other personnel, etc. Title bar 173 provides the user 11 with identification of the particular context-sensitive menu item being viewed. Once again, upon pressing and holding the middle Enter button 106, pop-up menu 172 is displayed with a context-sensitive menu item 175 therein, i.e., "Close Map" menu item.

Figure 11F:
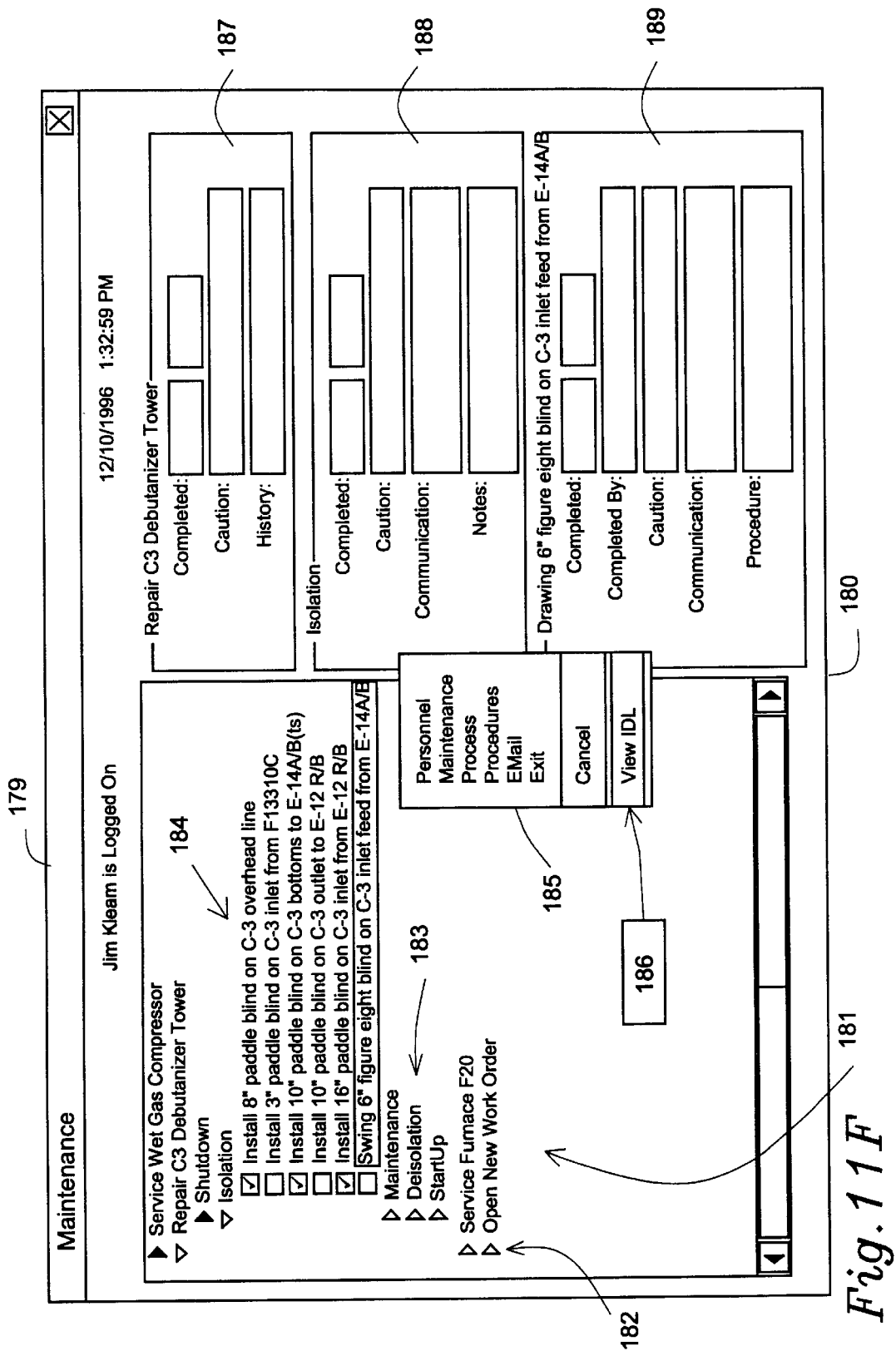
Figure 11G:
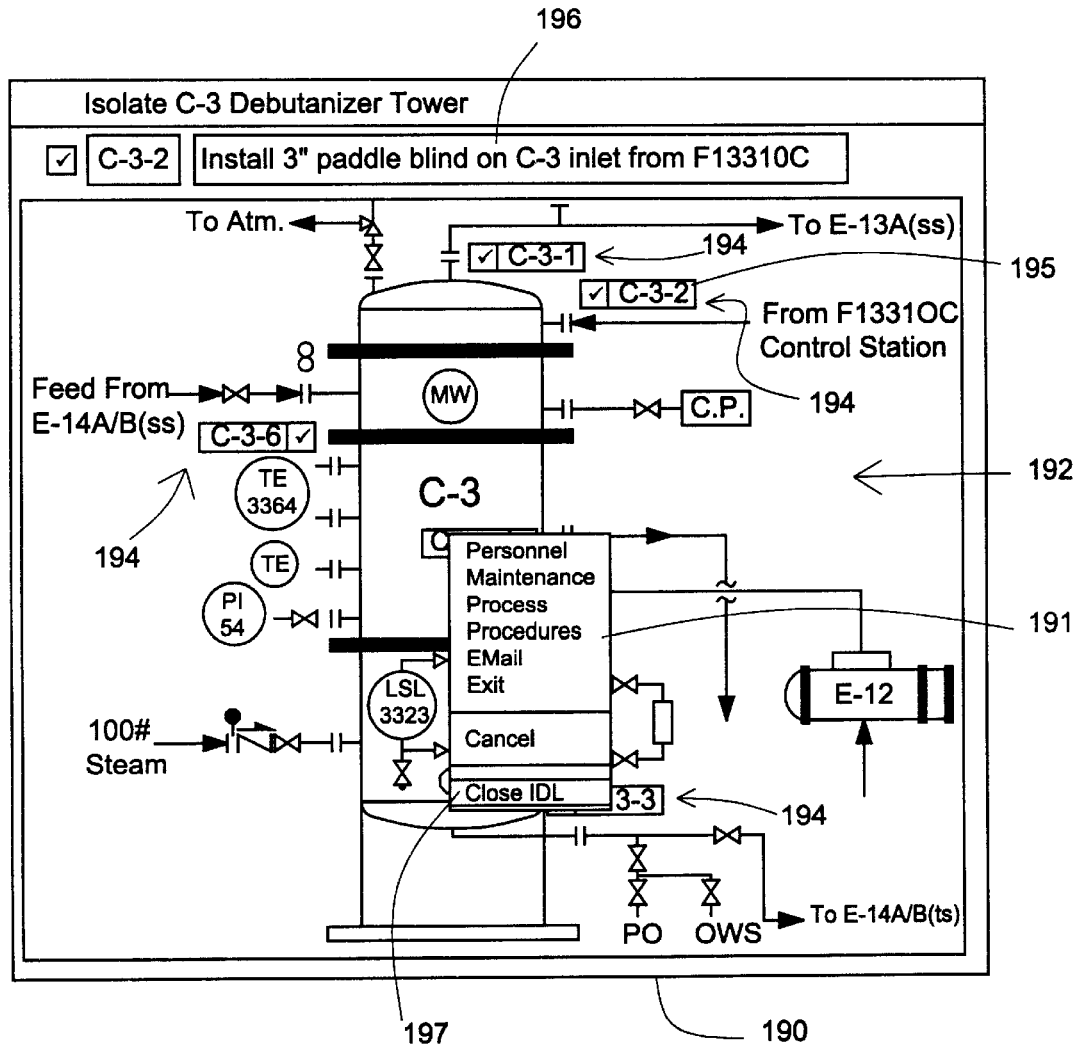

Display screen 180 of FIG. 11F shows the main window for the Maintenance application as opposed to the Personnel application. As identified in window title bar 179, the display screen 180 includes display of tree structure 181 including top level items 182, second level items 183, and third level items 184. Also displayed are display areas 187 associated with the top level tree items 182, the display area 188 associated with second level tree items 183, and display area 189 associated with third level tree items 184. Upon pressing and holding Enter button 106, pop-up menu 185 is displayed. Pop-up menu 185 includes the application menu items along with a context-sensitive menu item "View IDL" 186. Upon selection of this context-sensitive pop-up menu item 186 at the lowest level of tree detail in the maintenance window shown in display screen 180, a display screen 190 as shown in FIG. 11G is shown.

With respect to the display screen 190, the circular type of navigation within an application shall be described. Generally shown on display screen 190 is a device schematic 192, e.g., a debutanizer tower schematic. The device schematic 192 includes various sub-task areas 194. The Up and Down buttons 104, 108 move the cursor 195 in a circular fashion from sub-task 194 to sub-task 194 around the device schematic 192. The cursor 195 is represented as a highlighted sub-task label. As the cursor 195 is moved from sub-task to sub-task, the description in sub-task block 196 changes to a description associated with the particular sub-task highlighted. Further, pressing and releasing the middle Enter button 106 toggles the checkmarks for the highlighted sub-task to provide a further informational or completed status for the sub-task.

One skilled in the art will recognize that the circular nature of the navigation described herein is clearly not limited to device schematics but is applicable to any particular display configuration where a user would want to move within the screen display to select different options therein. For example, the screen display may be a map with various locations on the map being navigated through in a circular manner. Further, pop-up menu 191 can be displayed upon pressing and holding the Enter button 106 and then can be used to close the context-sensitive menu item 197, i.e., "Close IDL."

Figure 11H:
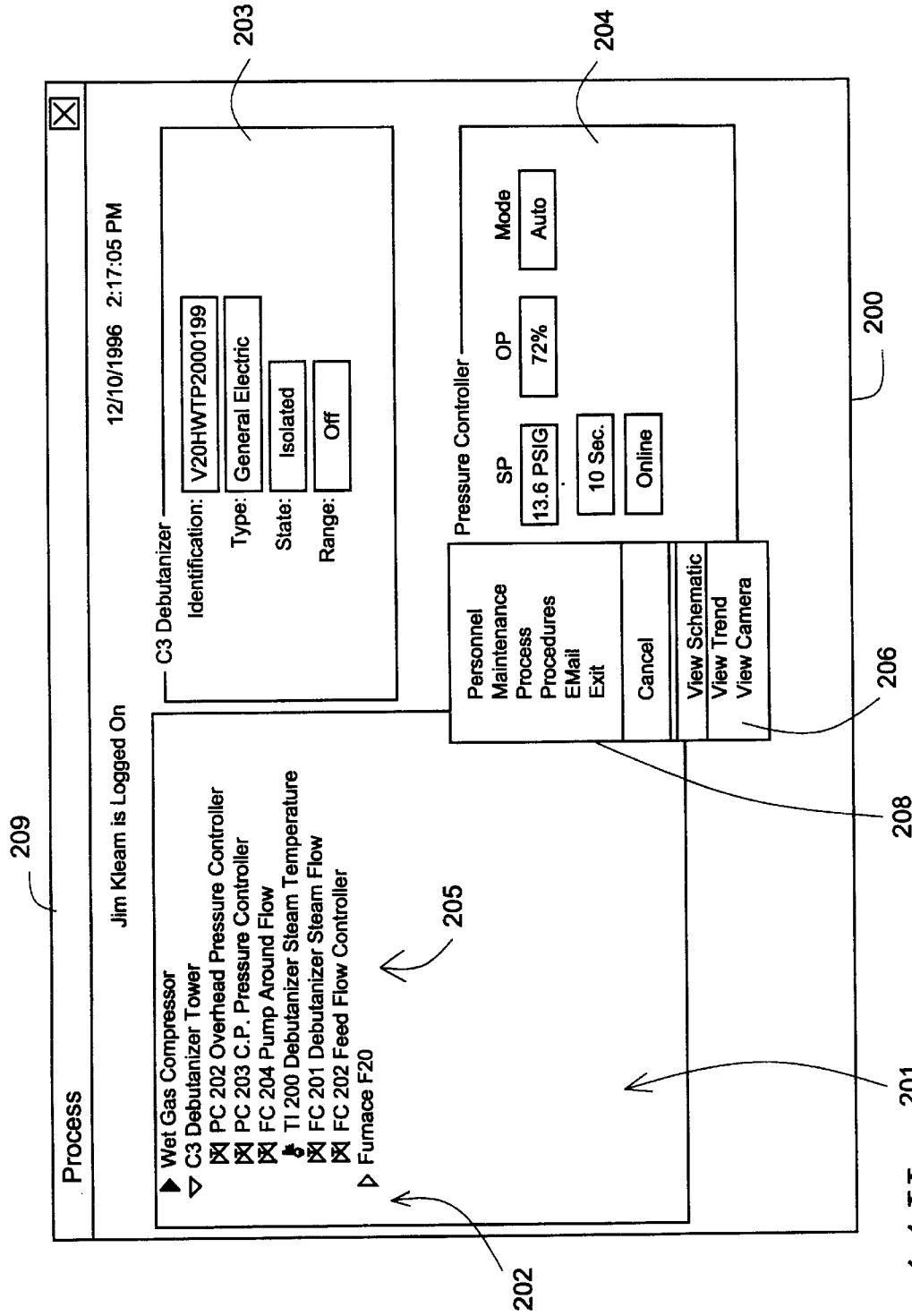

FIG. 11H shows the main window of the Process application in display screen 200. The elements displayed include the informational tree 201 having top level items 202 and second level items 205 expanded and shown. Window title bar 209 shows user 11 that the Process application is being used. Further, display area 203 shows information associated with a top level item 202 and display area 204 displays information associated with one of the second level items 205. Further shown in FIG. 11H is pop-up menu 208 which includes three context-sensitive menu items 206 including "View Schematic," "View Trend," and "View Camera."

Figure 11I:
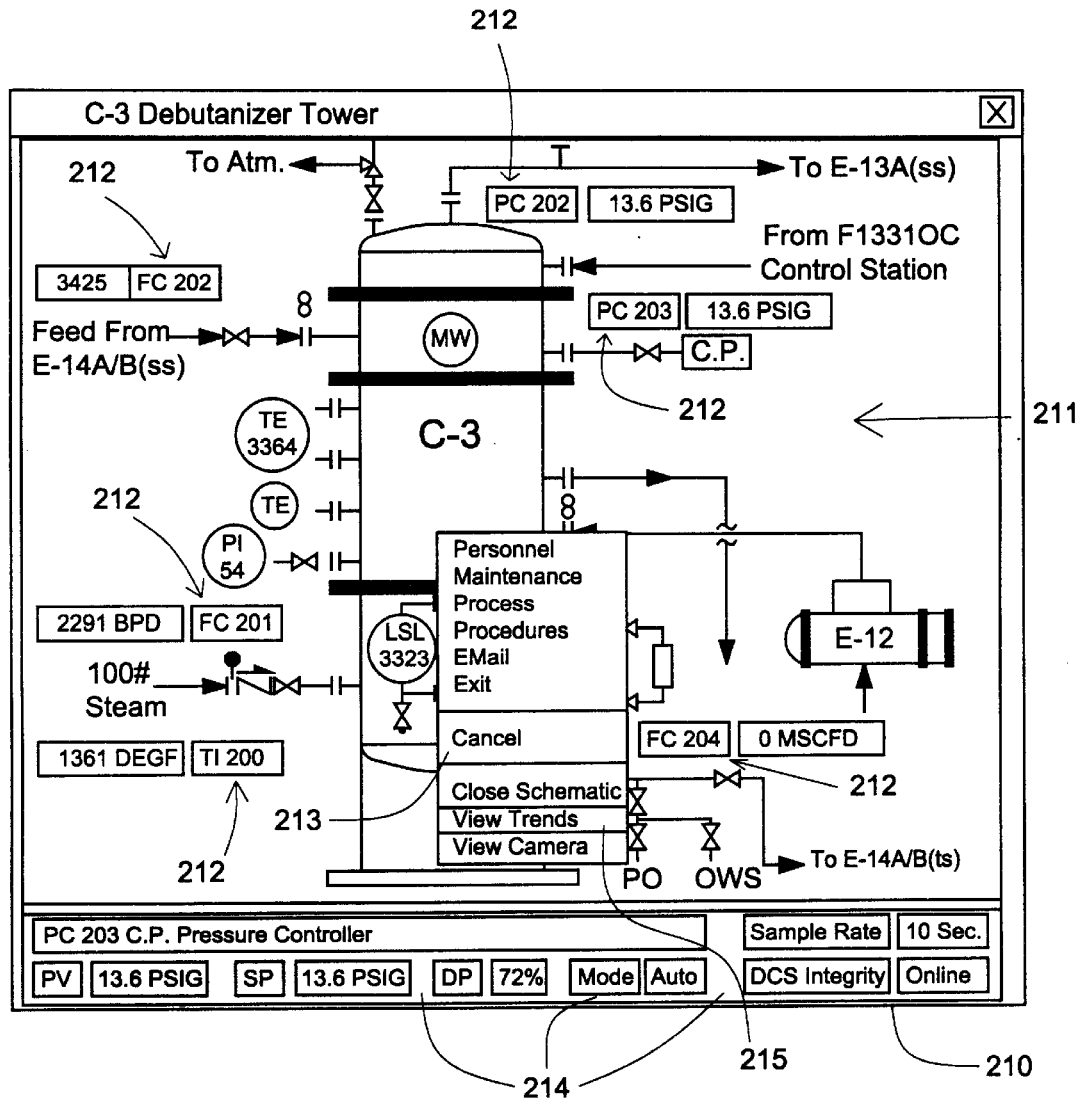
Figure 11J:
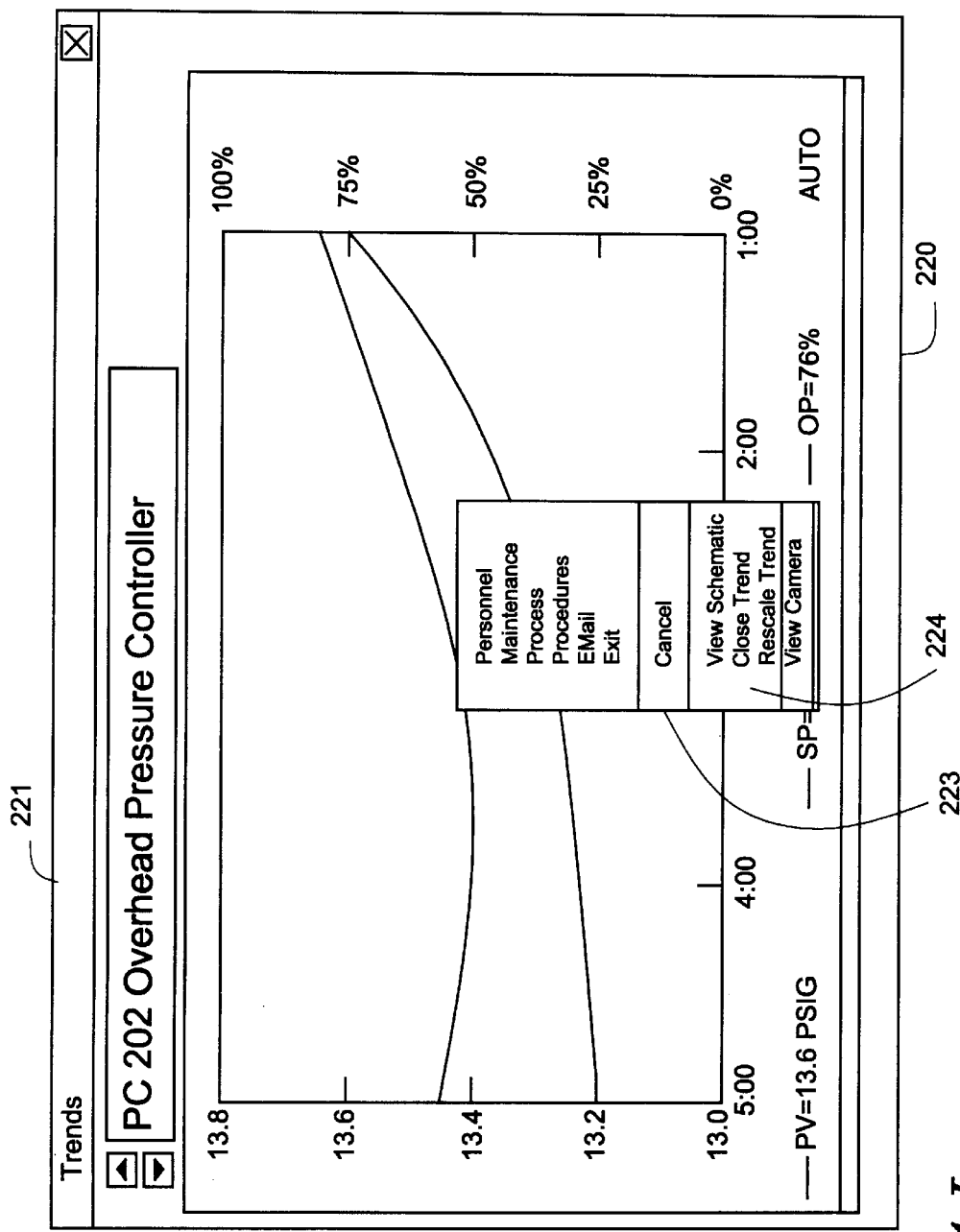

Selection of "View Schematic" is very similar in nature to that described with reference to FIG. 11G and a display screen 210 showing a device schematic 211 is provided such as shown in FIG. 11I. Once again, various sub-tasks 212 are associated with the device schematic 211 and can be navigated in a circular manner. Information block 214 at the bottom of the screen 210 provides up-to-date information with respect to the highlighted sub-task or device element. Further shown on display 210 is a pop-up menu 213 that includes several additional context-sensitive menu items 215 for the particular highlighted sub-task 212 of device schematic 211. For example, selection of "View Trends" of context-sensitive menu items 215 results in a display screen 220 showing trends with respect to a particular sub-task such as shown in FIG. 11J. In this particular case, the trend is with respect to an overhead pressure controller and the trend is shown in graphical form. However, other forms of displaying trends are also applicable.

Shown on screen 220 in title bar 221 is the context-sensitive menu item selected by the user 11, i.e., Trends. Further shown is a pop-up menu 213 attained as previously described which includes several context-sensitive menu items 224 for performing various tasks at this point in the user interface.

It will be noted that trends may be selected at both the sub-task level and at the device schematic level. For example, "View Trends" context-sensitive menu item is available as shown in FIG. 11H and also as shown in FIG. 11I.

In summary, with regard to the graphical user interface and navigational three-button input interface 102, navigating around a display with just the Up and Down buttons 104, 108, and Enter button 106 is achieved primarily using a tree-based user interface control. For example, in the Process data application, the main screen uses a tree structure as a means to navigate to groups of data that are related to pieces of equipment, such as the compressors, towers, furnaces, etc. of a plant. The user can move up and down the tree by using the Up and Down buttons 104, 108. The user can collapse and expand the information tree by clicking the Enter button 106. Further, clicking on the Enter button 106 at the end of a particular tree structure, such as when particular personnel are listed and a box therein is to be checked, serves to accomplish a function such as to check off that step.

Further, in addition to tree-based navigation, an additional type of navigation within an application window is the circular navigation. For example, using the context-sensitive menu options available when viewing process data, the user can navigate to trends of the data and schematics that show the data in a process flow diagram type of format. These types of screens do not display a tree structure. Rather, these sub-screens are specific to the process data being displayed on the main screen when the menu option is called up. For example, if one selects "View Schematic" when looking at process data for a C-3 tower process data, the schematic displayed is relevant to the C-3 tower. Once viewing the schematic, as illustrated in FIG. 11I, the user can "circle around the display" in one direction by clicking the Up button 104 or circle around the display in the other direction by clicking the Down button 108. When viewing trends of the data, as described with respect to FIG. 11J, the trend related to one point fills an entire screen, so pressing the Up or Down buttons cycle the user through a set of trends related to the group of points in question; for example, the various sub-tasks related to the C-3 tower as shown in FIG. 11I. Navigating back to previous screens is performed by using the context-sensitive menu which generally has options for closing the currently viewed screen.

One skilled in the art will recognize that the particular look-and-feel described with reference to FIGS. 11A–11J requires the need to map the data into the structure required by the navigation scheme. For example, the data must be mapped into the various tree level items.

Figure 12:
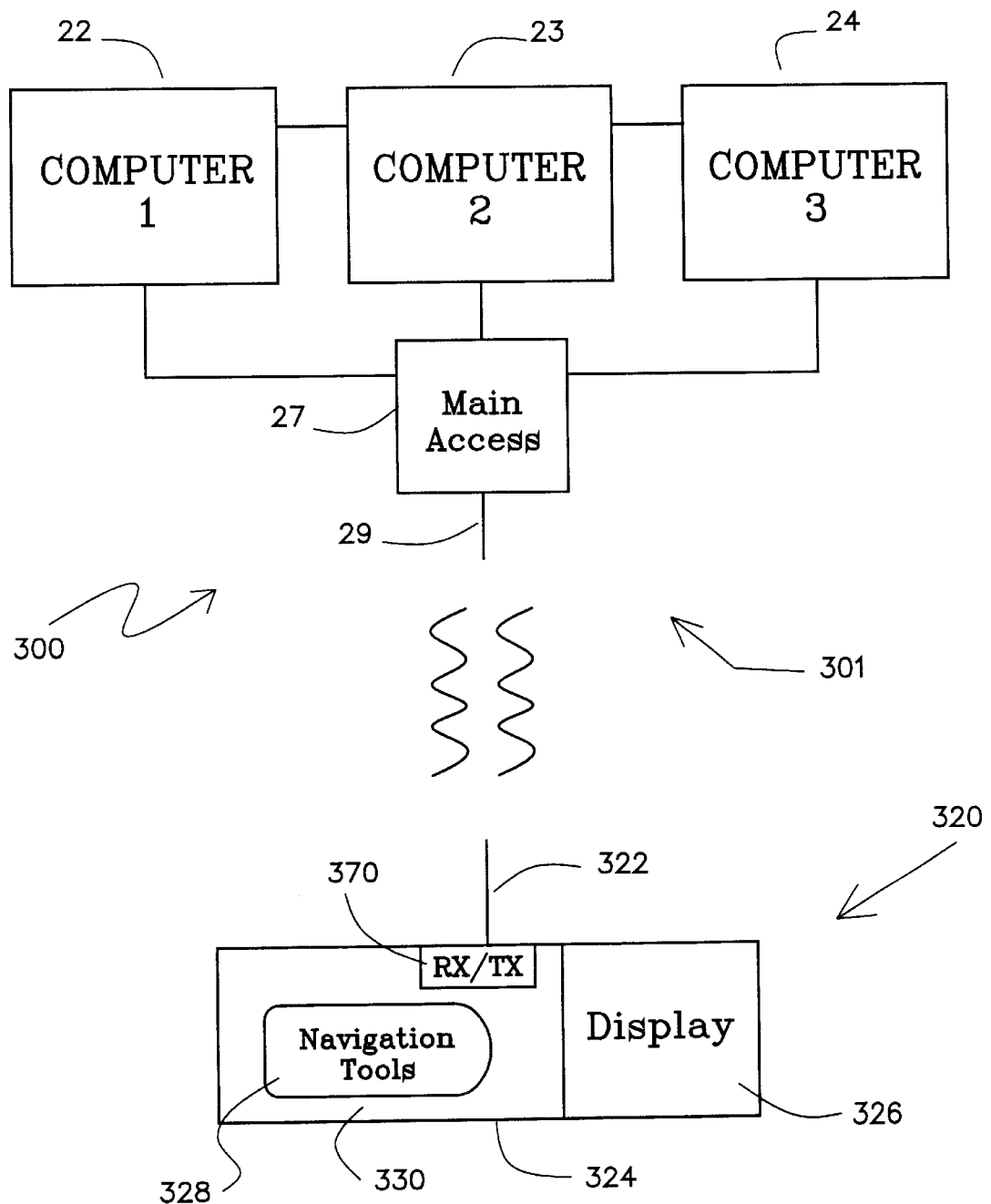
FIG. 12 is a block diagram of an alternate personal information processing system including an alternate hand-held computer device according to the present invention, wherein the computing unit is integrated within the hand-held device with the display and navigational input tools.
Figure 13:
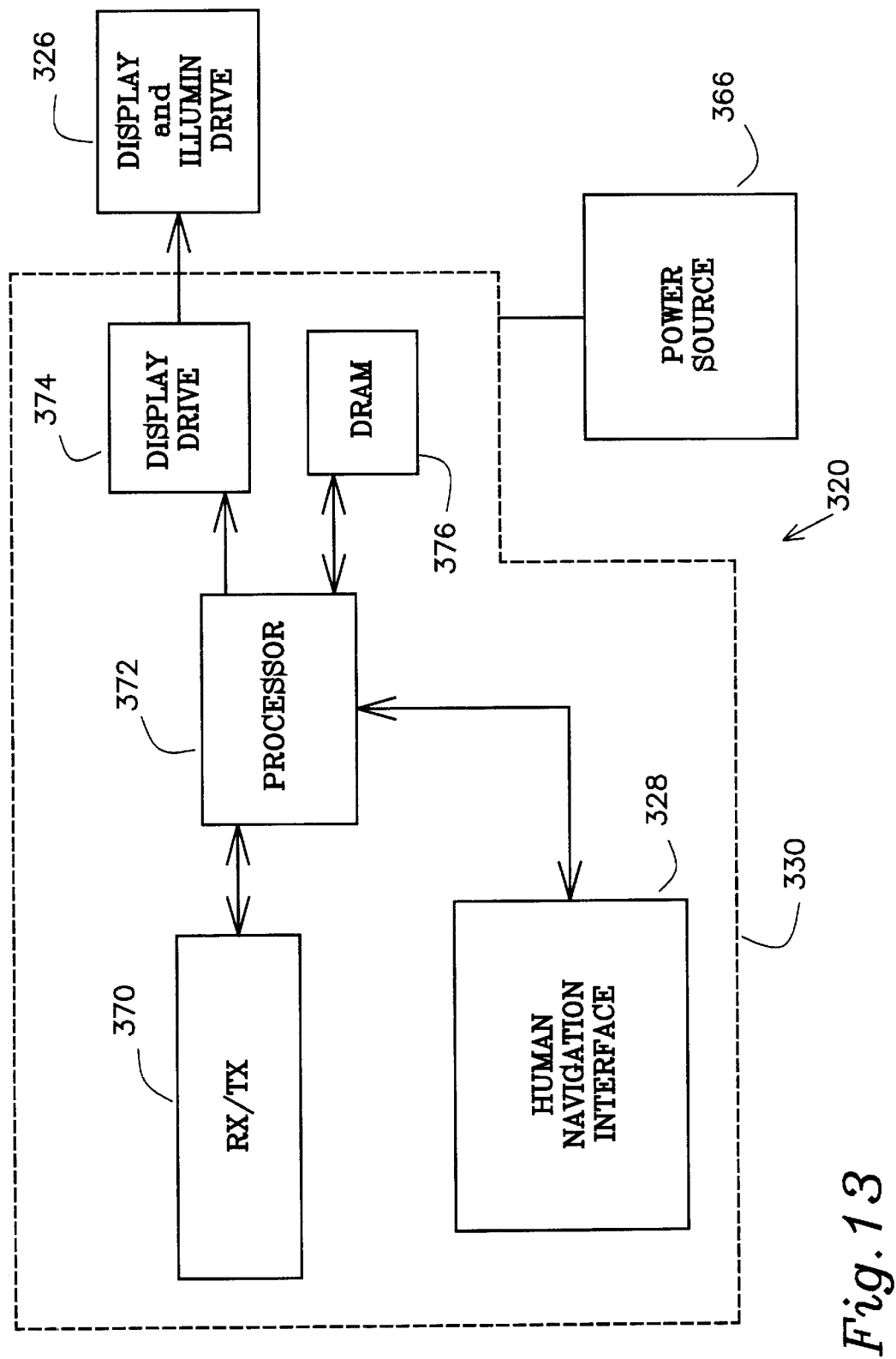
FIG. 13 is a block diagram of further detail of the hand-held computer device of FIG. 12 including an integrated processing unit.

FIGS. 12 and 13 show an alternative configuration for the computer apparatus according to the present invention. In this particular configuration, the processing unit is integrated into the hand-held display unit as opposed to the use of a separate connected computing unit. As shown in FIG. 12, the personal information processing system 300 includes a wireless transmission link 301 which is substantially similar to that described with reference to FIGS. 1 and 2. The only difference is that the transceiver 370 of the link is now integrated within housing 324 of the hand-held computer apparatus 320, as opposed to being a part of a separate computing unit.

The hand-held computer apparatus 320 as shown in FIG. 12 includes housing 324. The housing 324 substantially encloses computer unit/display driver hardware and/or software 330 operable under user navigational tools 328 and integrated within the housing 324 with display 326. Antenna 322 and transceiver/modem circuitry 370 form a part of the wireless transmission link 301.

The different configurations for the navigational tools 328 and computing unit 330 as well as display 326 are substantially the same as indicated previously with respect to the other embodiments described above. However, miniaturization allows them all to be integrated within housing 324.

In one particular implementation, hardware and/or software 330 includes transceiver 370 and the other elements as shown and described with reference to FIG. 13. The hand-held apparatus 32 includes hardware and/or software 330, display 326, and power source 366, e.g., lithium ion batteries. The hardware/software 330 generally includes the following: transceiver circuitry 370, processor 372, display driver circuitry 374, DRAM 376, along with human navigation interface circuitry 328 for use with the applicable navigational tools. The transceiver circuitry 370 may use a dual-spread spectrum system. Processor 372 may be a processor such as a processor available under the Pentium® trade designation with a display controller, PCMCIA master controller, and memory interface. The display 326 and associated driving circuitry 374 may be any commercially available display and driver such as those previously described herein. Further, human navigation interface may be any configuration for supporting the navigational tools described herein.

Although the invention has been described with particular reference to preferred embodiments thereof, variations and modifications to the present invention can be made within a contemplated scope of the claims as is readily known to one skilled in the art.

What is claimed is:

1. A computer apparatus comprising:
   a computer processing unit, the computer processing unit including a processor device for operating upon data and providing data for display, and
   a handheld input/output display unit, the display unit comprising:
      a housing sized to be grasped by a user's single hand, wherein the housing includes an upper surface, a lower surface, and an eyepiece,
      a computer display located within the housing at a position to allow the user to view the computer display through the eyepiece,
      a display driver for presenting data from the processing unit on the computer display, and
      navigational input tools for navigating in computer program applications integrated with the computer display in the housing and operatively connected to provide user input to the processing unit, wherein the navigational input tools comprise a mouse including a force actuated pointer integrated within the housing for operation at the upper surface thereof, and further wherein the navigational input tools including the mouse are positioned for operation by one or more fingers of the user's single hand such that the user's single hand can simultaneously grasp the housing and operate the navigational input tools.

2. The apparatus of claim 1, wherein the computer processing unit is positioned within the housing of the handheld input/output display unit.

3. The apparatus of claim 1, wherein the computer processing unit is a separate computer processing unit operatively connected to the handheld input/output display unit.

4. The apparatus of claim 3, wherein the separate computer processing unit is a user wearable computing unit operatively connected to the handheld input/output display unit by an electrical cable.

5. The apparatus of claim 1, wherein the navigational input tools further comprise at least one button.

6. The apparatus of claim 5, wherein the navigational input tools include a single button mouse.

7. The apparatus of claim 1, wherein the lower surface includes a recessed thumb indent, and further wherein the thumb indent includes a switch.

8. The apparatus of claim 7, wherein the switch controls power to the apparatus.

9. The apparatus of claim 7, wherein the switch controls activation of the mouse.

10. The apparatus of claim 1, wherein the handheld display unit further includes one or more microphones integrated within the housing.

11. A handheld apparatus for use with a computing unit, the hand-held apparatus comprising:
    a housing sized to be grasped by a user's single hand and having a longitudinal axis extending therethrough from a first end to a second end, wherein the housing includes an upper surface and a lower surface extending from the first end to the second end, and further wherein the housing includes an eyepiece at the first end of the housing;
    a computer display located within the housing at a position to allow the user to view the computer display through the eyepiece; and
    navigational input tools for navigating in computer program applications comprising a mouse including a force actuated pointer, wherein the navigational input tools including the mouse are integrated within the housing with the computer display such that the navigational input tools are operable at the upper surface of the housing by one or more fingers of the user's single hand such that the user's single hand can simultaneously grasp the housing and operate the navigational input tools.

12. The apparatus of claim 11, wherein the computing unit is integrated within the housing with the display and navigational input tools, the computing unit comprising:
    a transceiver interface for transmitting and receiving data in the wireless environment;
    a processor device for operating upon such data presenting data for display on the computer display.

13. The apparatus of claim 11, wherein the navigational input tools further comprise at least one button.

14. The apparatus of claim 13, wherein the navigational input tools are a single button mouse.

15. The apparatus of claim 13, wherein the navigational input tools are a two button mouse.

16. The apparatus of claim 11, wherein the lower surface includes a recessed thumb indent, and further wherein the thumb indent includes a switch.

17. The apparatus of claim 16, wherein the switch controls power to the apparatus.

18. The apparatus of claim 16, wherein the switch controls activation of the navigational input tools.

19. The apparatus of claim 11, wherein the handheld apparatus further includes one or more microphones integrated within the housing.

* * * * *